US012632490B2

(12) United States Patent
Nagae et al.

(10) Patent No.: US 12,632,490 B2
(45) Date of Patent: May 19, 2026

(54) STORAGE MEDIUM, DOCUMENT PROCESSING APPARATUS, AND DOCUMENT PROCESSING METHOD

(71) Applicant: KABUSHIKI KAISHA TOSHIBA, Tokyo (JP)

(72) Inventors: Hisayoshi Nagae, Yokohama Kanagawa (JP); Takami Yoshida, Kamakura Kanagawa (JP); Yuka Kobayashi, Seto Aichi (JP); Tsuyoshi Kushima, Chigasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 19/056,848

(22) Filed: Feb. 19, 2025

(65) Prior Publication Data

US 2025/0371067 A1     Dec. 4, 2025

(30) Foreign Application Priority Data

Jun. 3, 2024     (JP) ................................. 2024-090080

(51) Int. Cl.
*G06F 16/383* (2019.01)
(52) U.S. Cl.
CPC .................................. *G06F 16/383* (2019.01)
(58) Field of Classification Search
None
See application file for complete search history.

(56) References Cited

U.S. PATENT DOCUMENTS

| 2015/0227528 | A1* | 8/2015 | Kang | ................ | G06F 16/24578 |
| | | | | | 707/750 |
| 2016/0196347 | A1* | 7/2016 | Cheung | ............... | G06F 16/9038 |
| | | | | | 707/706 |
| 2020/0117709 | A1* | 4/2020 | Galitsky | ................ | G06N 20/00 |
| 2021/0081613 | A1* | 3/2021 | Begun | .................... | G06N 20/00 |
| 2024/0168987 | A1 | 5/2024 | Yoshida et al. | | |

FOREIGN PATENT DOCUMENTS

JP     2024074007 A     5/2024

OTHER PUBLICATIONS

Index Guide—LlamaIndex https://docs.llamaindex.ai/en/stable/ module _guides/indexing/index_guide/.
Web site: Let's summarize the overview of the RAG framework LlamaIndex, 2023, URL: https://zenn.dev/nomhiro/articles/llama-ind ex-abstract.

* cited by examiner

*Primary Examiner* — Thu N Nguyen
(74) *Attorney, Agent, or Firm* — Holtz, Holtz & Volek PC

(57)     ABSTRACT

A non-transitory computer-readable storage medium storing a program for causing a computer to divide a document to be retrieved into individual content chunks to generate document chunks, divide each of the document chunks into document blocks having a predetermined number or less of characters, extracts the document blocks for which a similarity score is high from among the document blocks, generates a retrieval result, and rearrange the order of the document blocks included in the retrieval result to make the order of the document blocks that belong to an identical document chunk consecutive, and make the order of the document blocks that belong to the identical document chunk match the order in the document chunk.

10 Claims, 17 Drawing Sheets

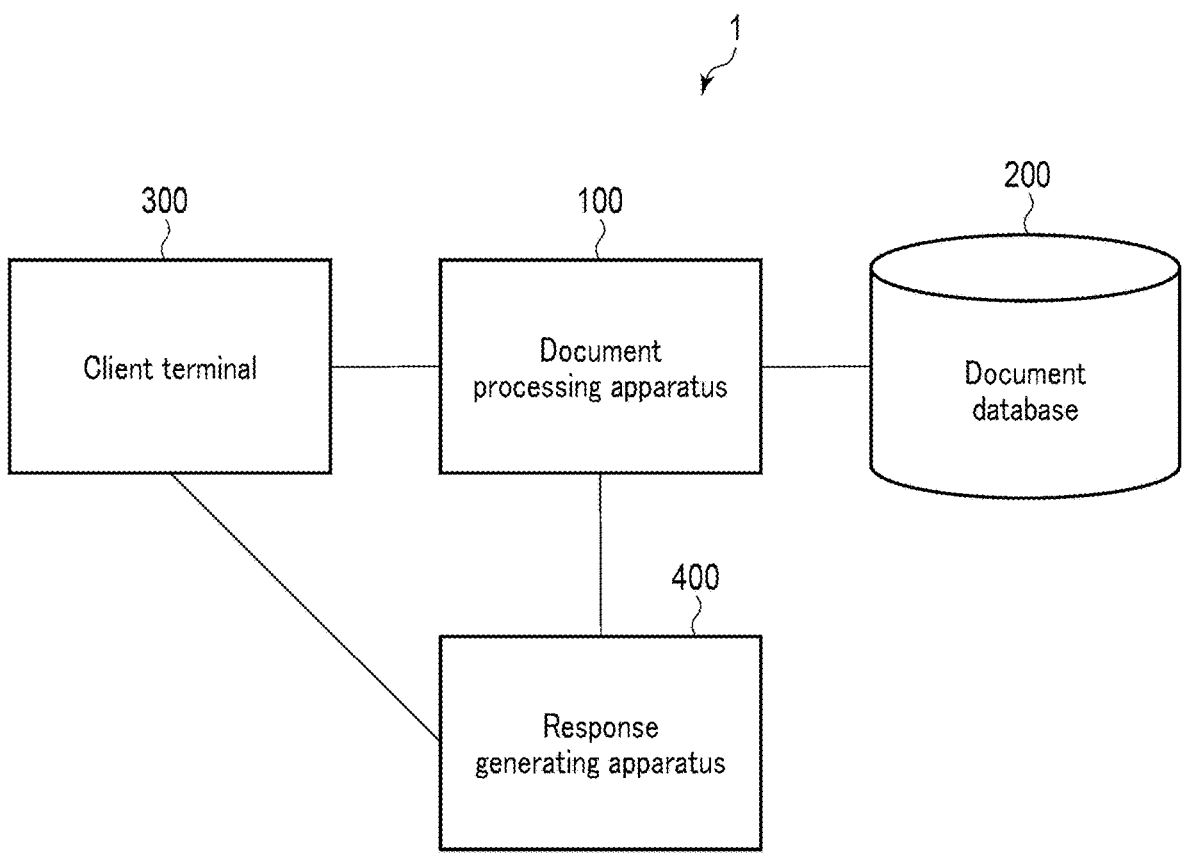
F I G. 1

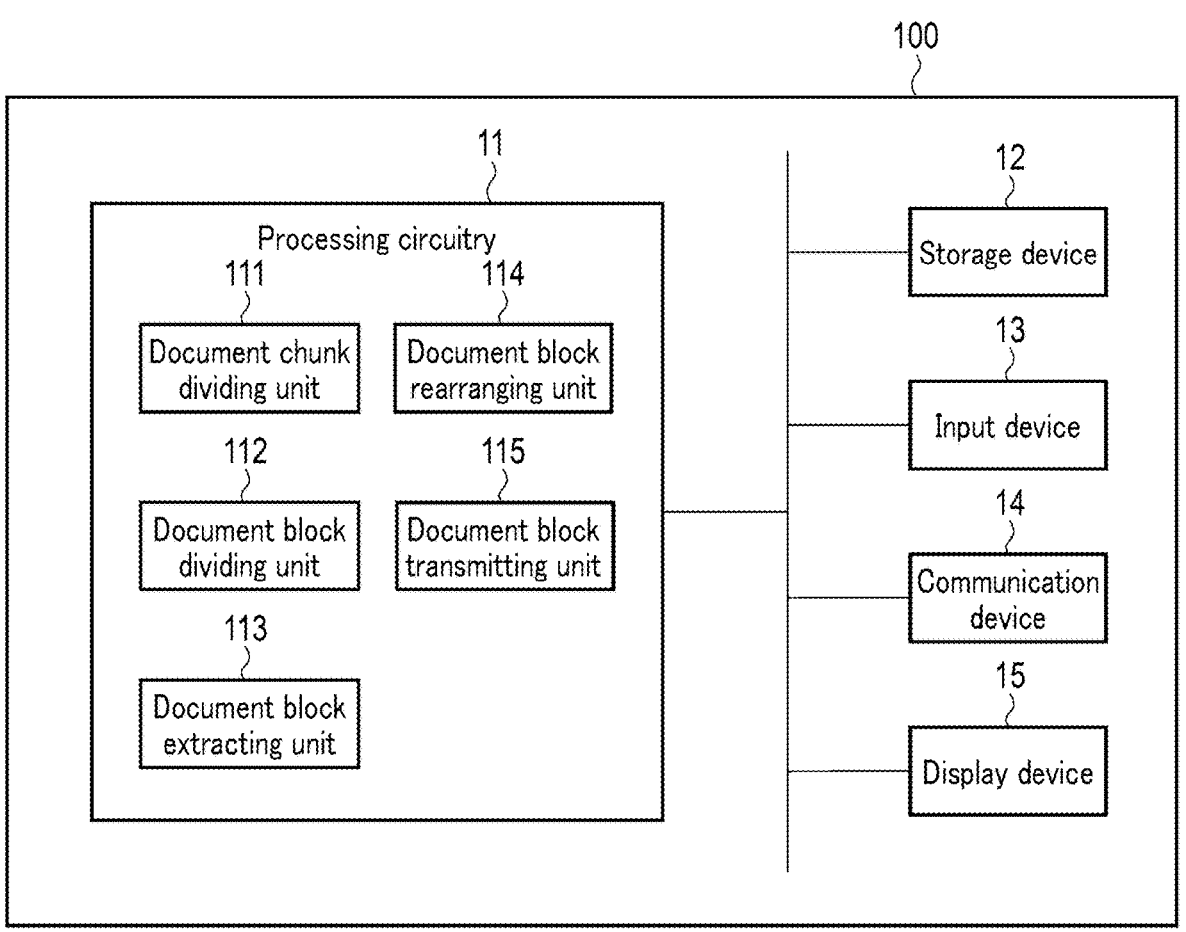
F I G. 2

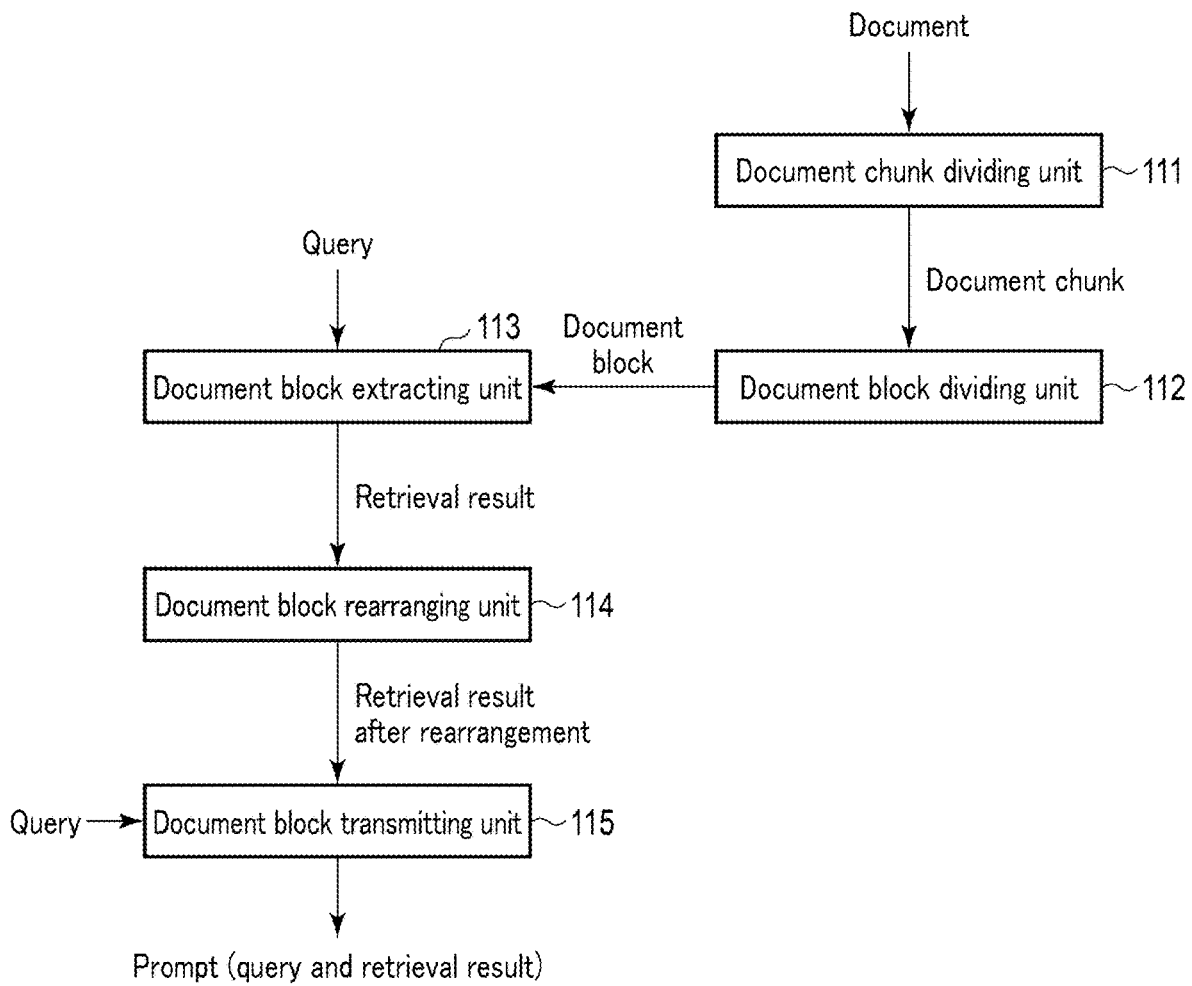
F I G. 5

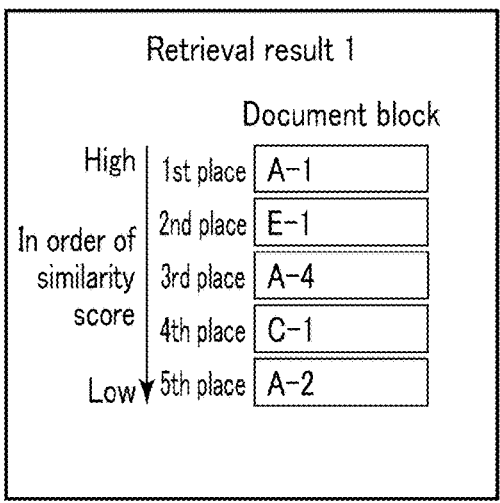
F I G. 6
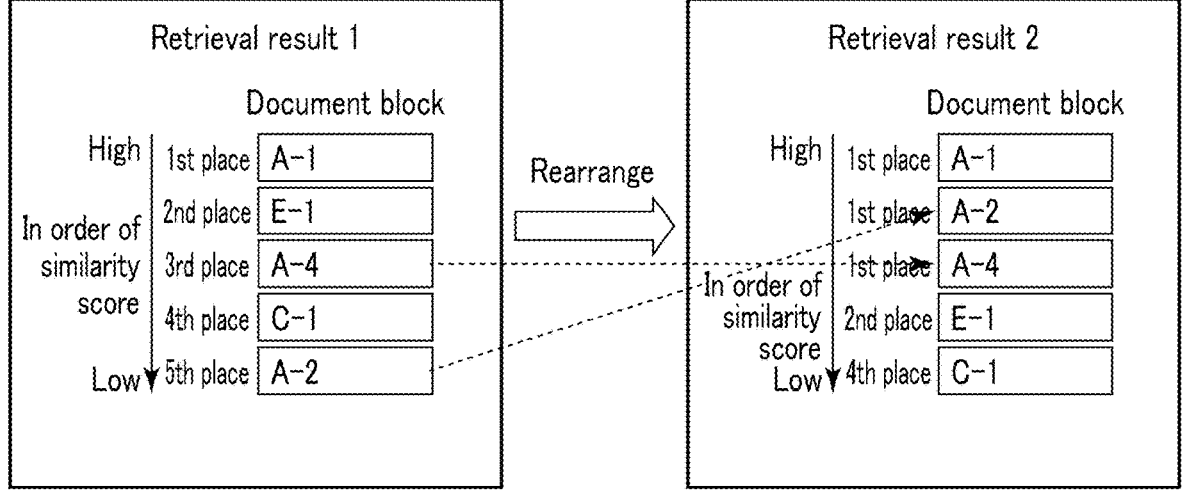
F I G. 7

Mean subjective evaluation score
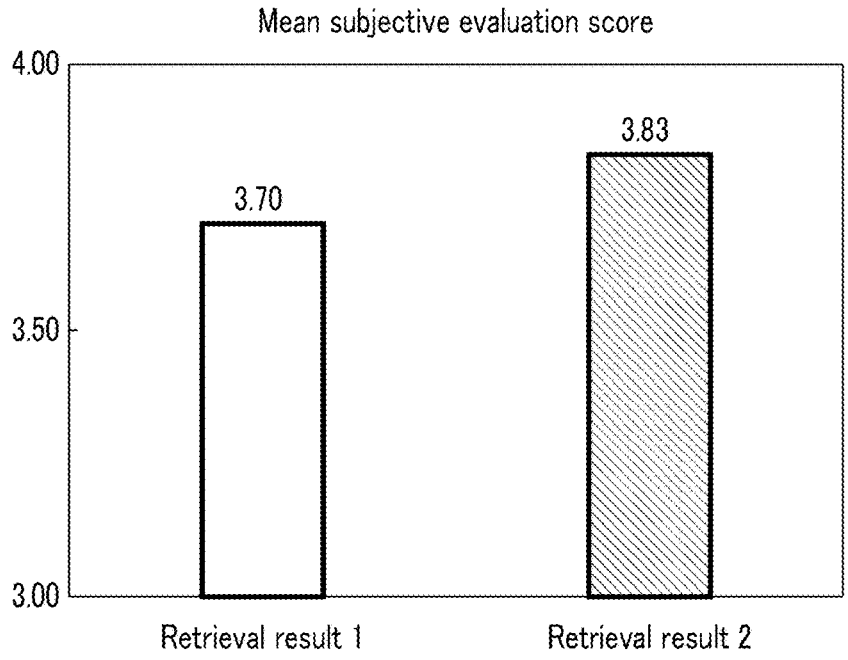
F I G. 8
Histogram of each grade
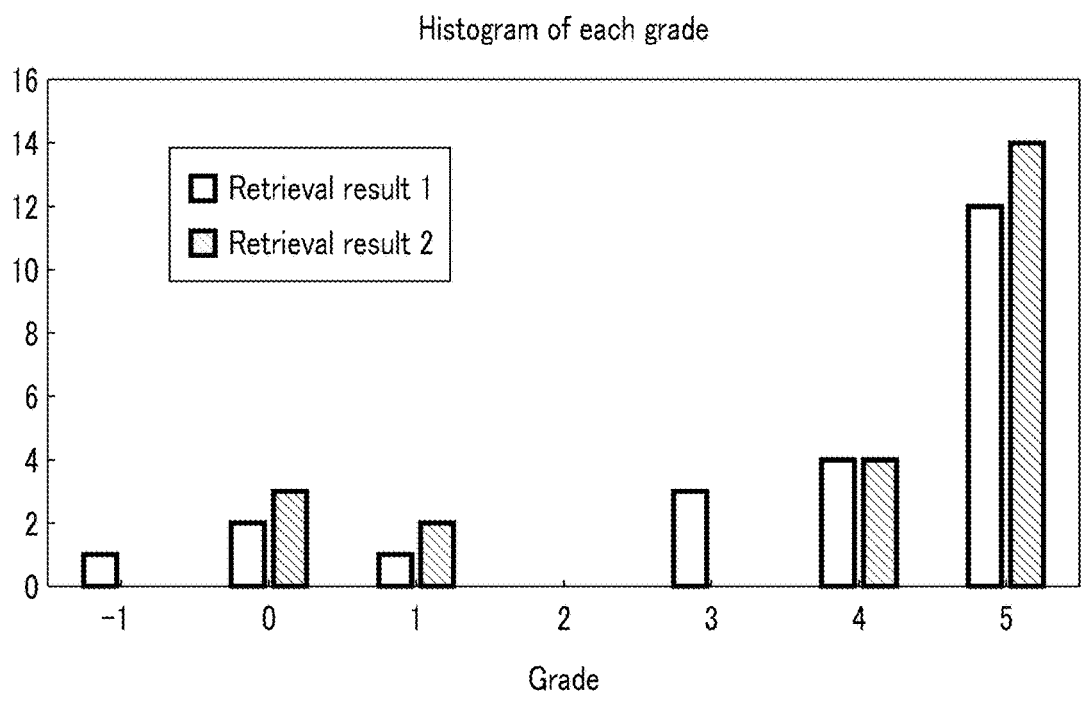
F I G. 9

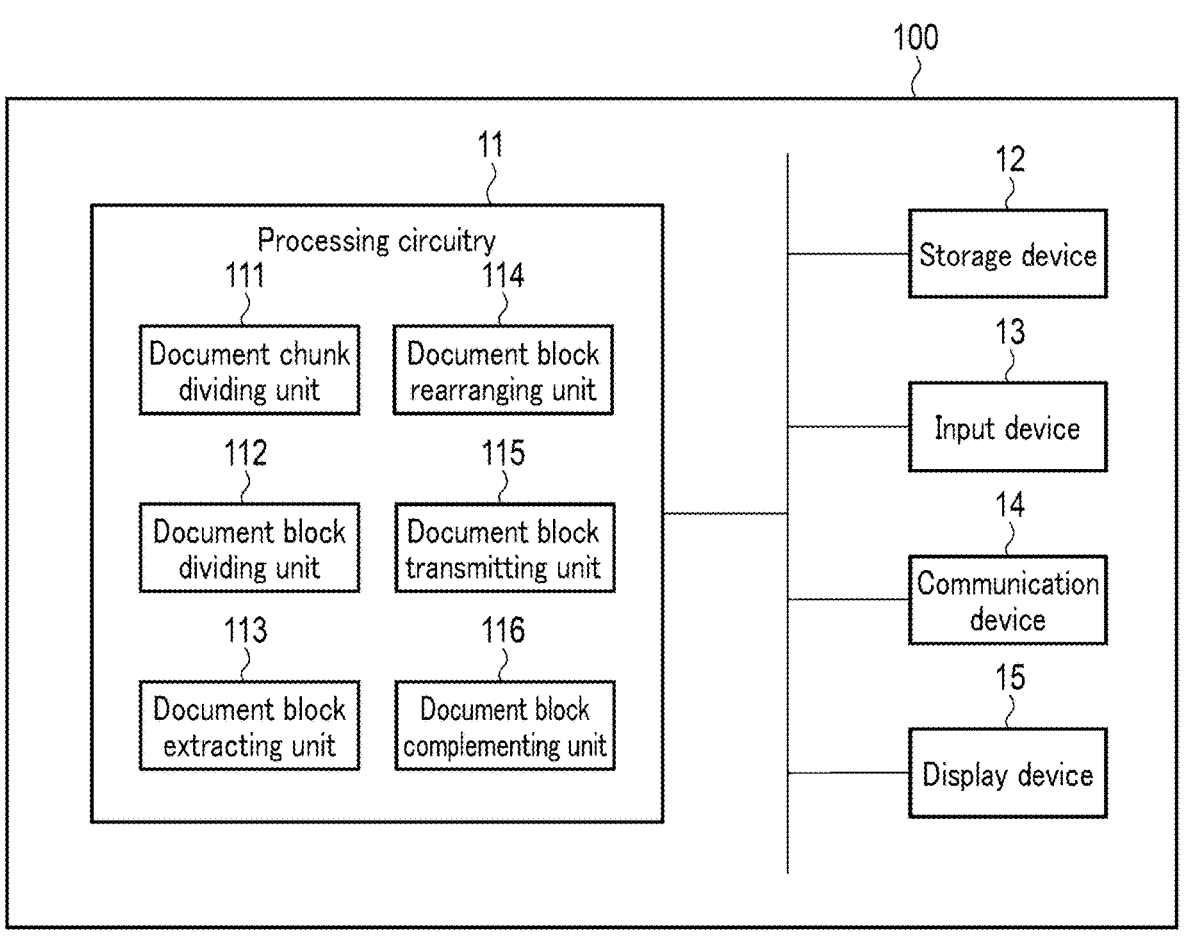
F I G. 10

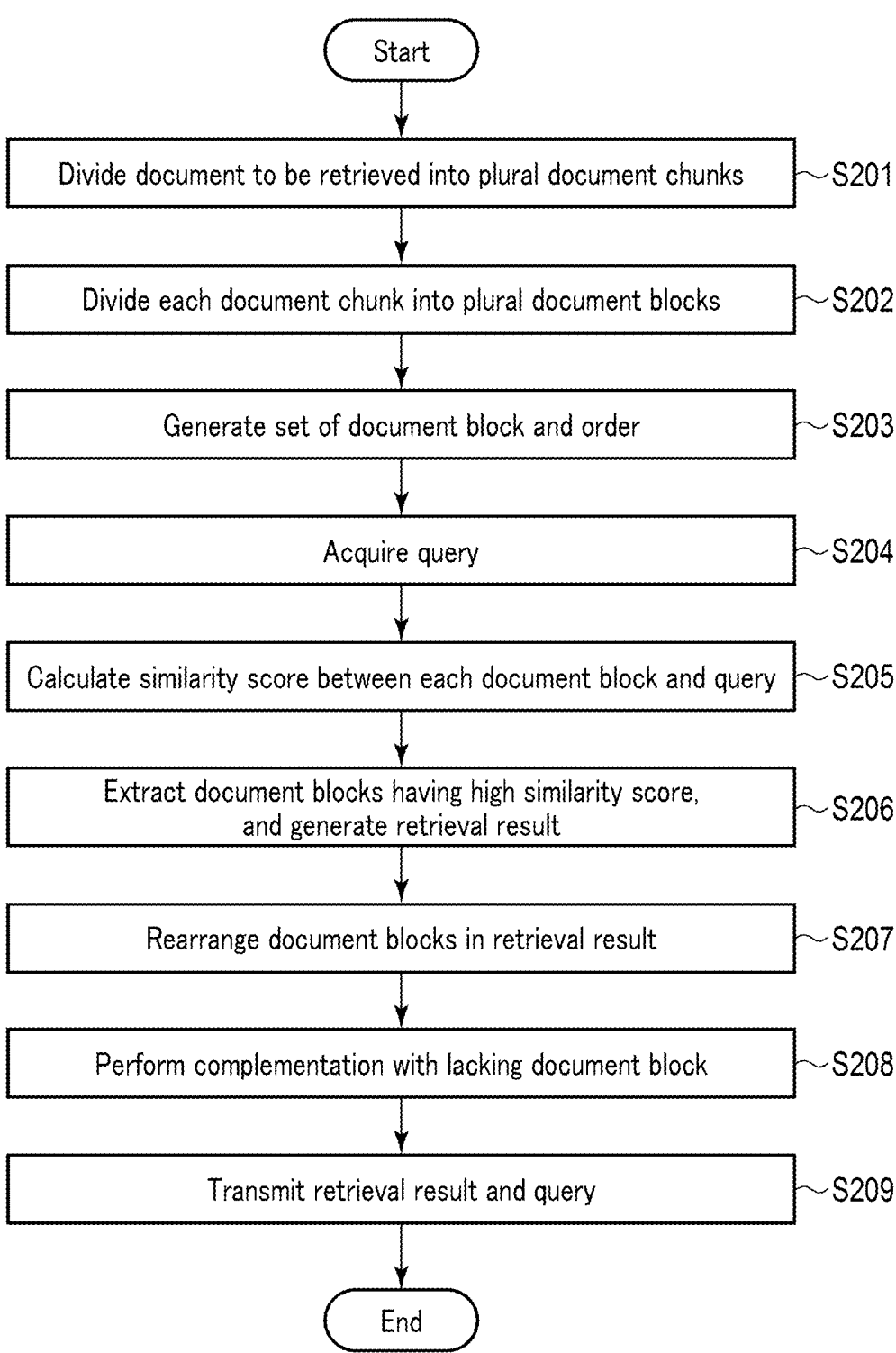

Start

Divide document to be retrieved into plural document chunks ~S201

Divide each document chunk into plural document blocks ~S202

Generate set of document block and order ~S203

Acquire query ~S204

Calculate similarity score between each document block and query ~S205

Extract document blocks having high similarity score, and generate retrieval result ~S206

Rearrange document blocks in retrieval result ~S207

Perform complementation with lacking document block ~S208

Transmit retrieval result and query ~S209

End

F I G. 11

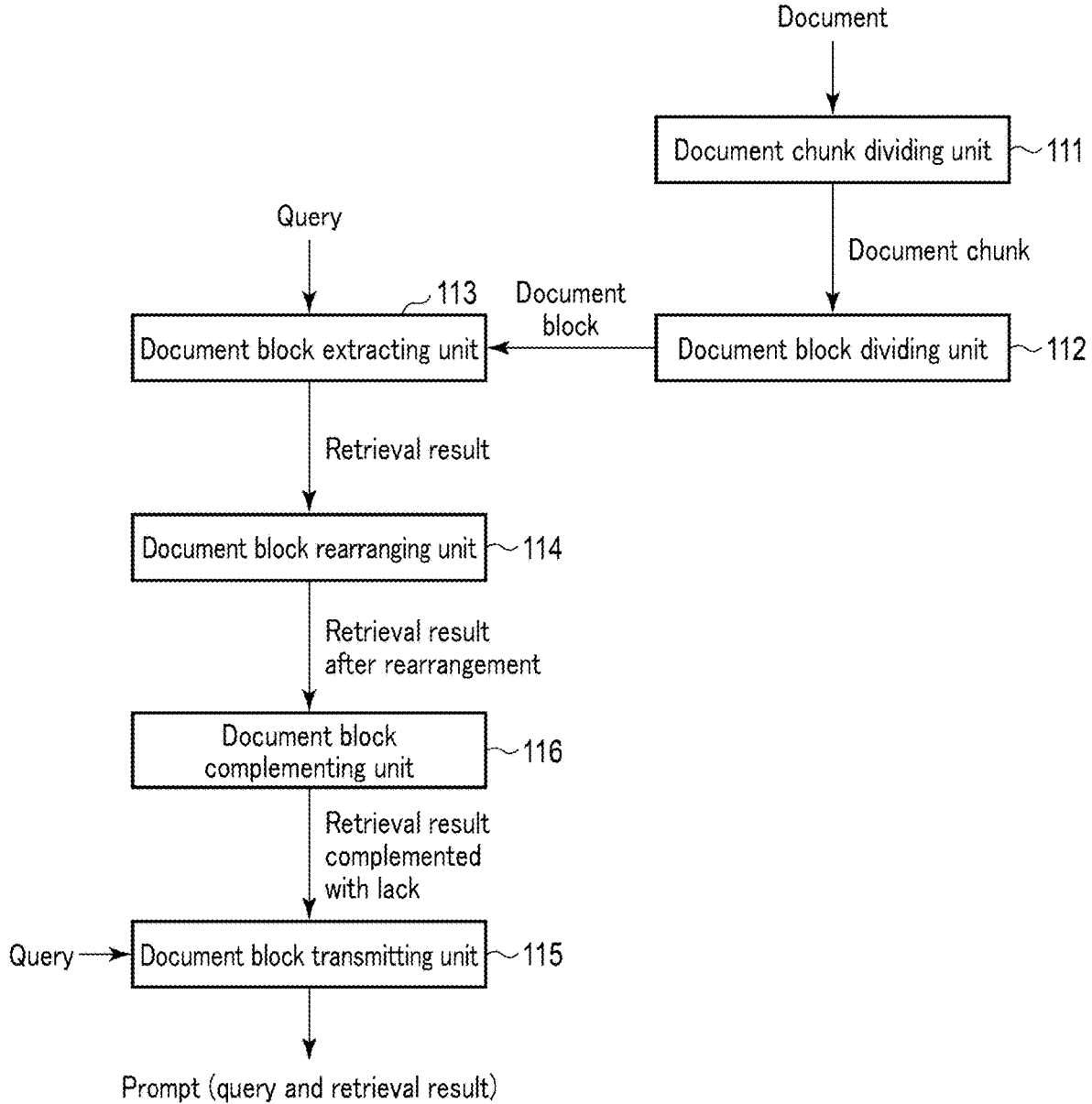
F I G. 12

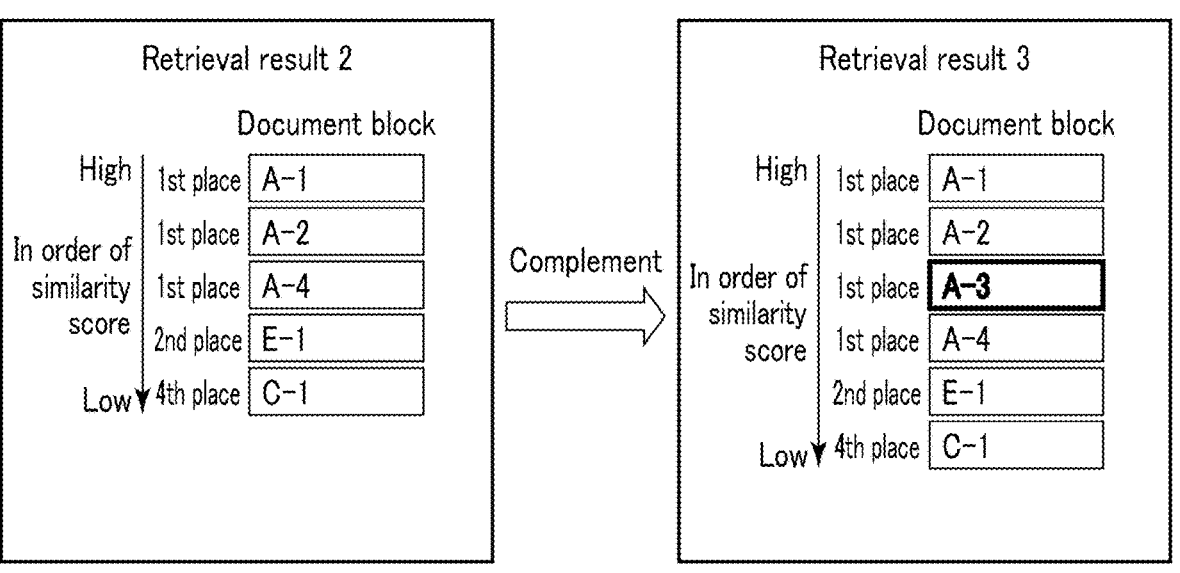
F I G. 13
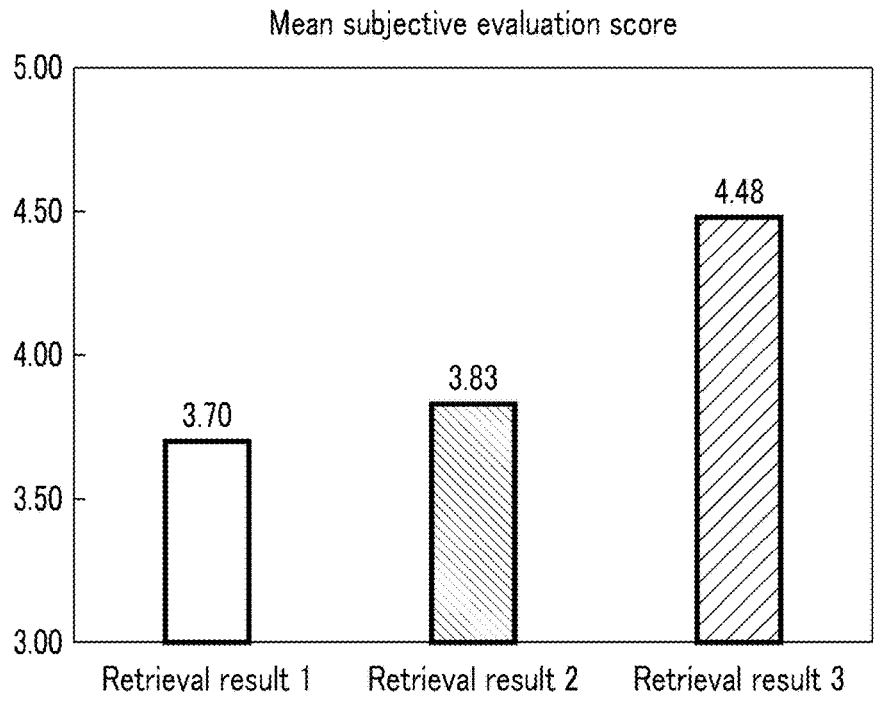
F I G. 14

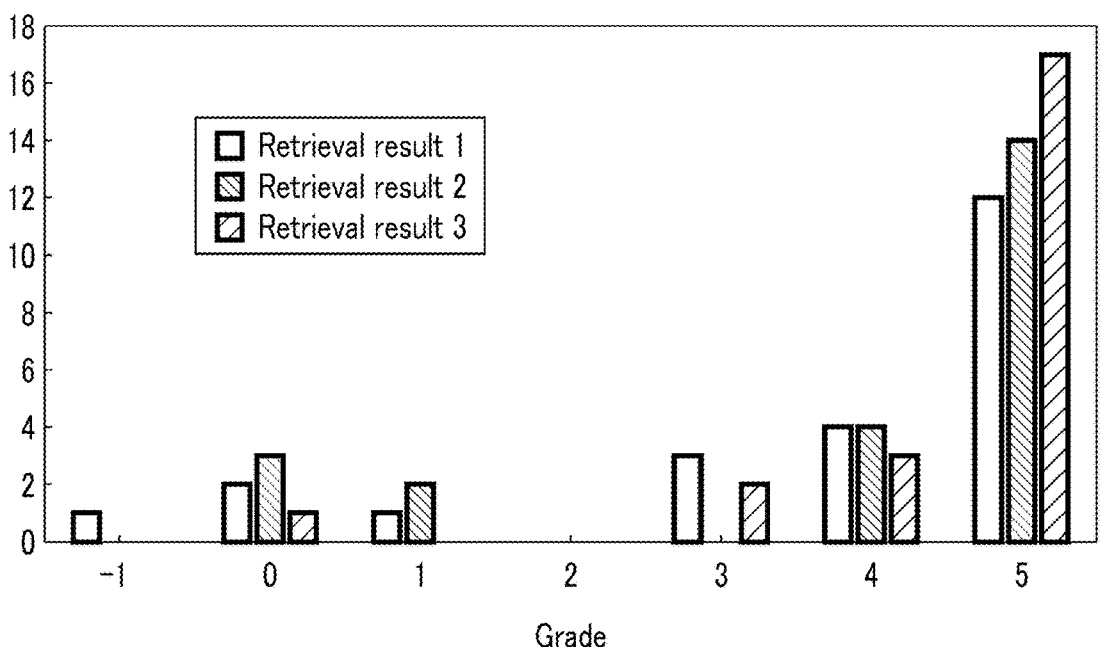
F I G. 15
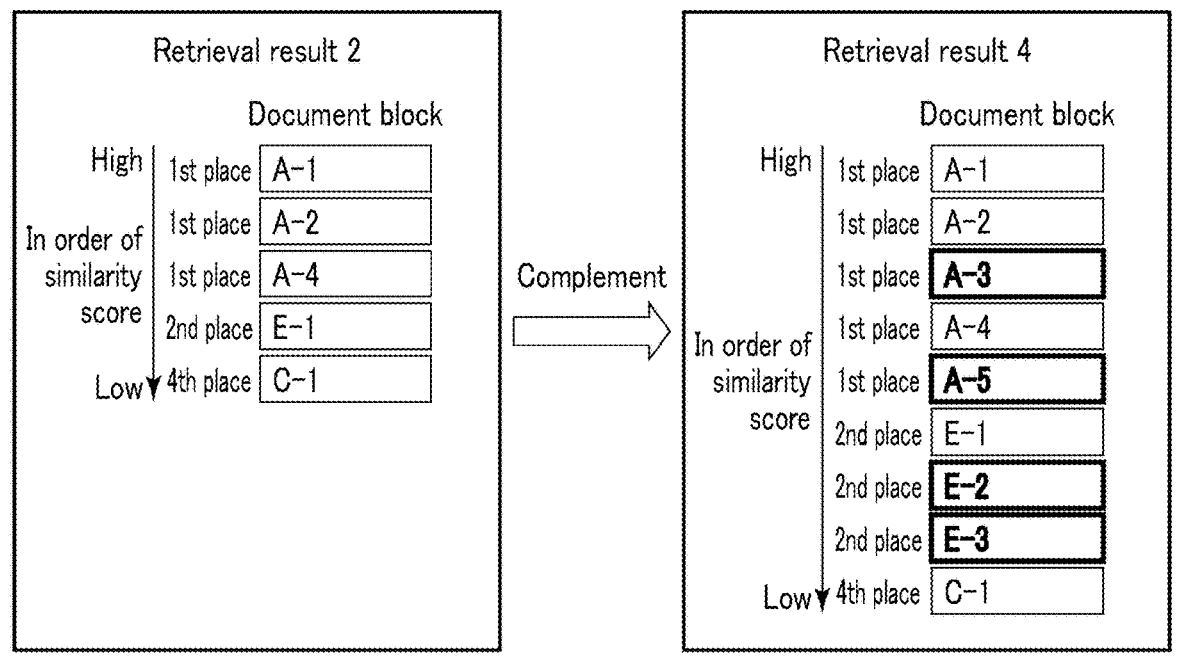
F I G. 16

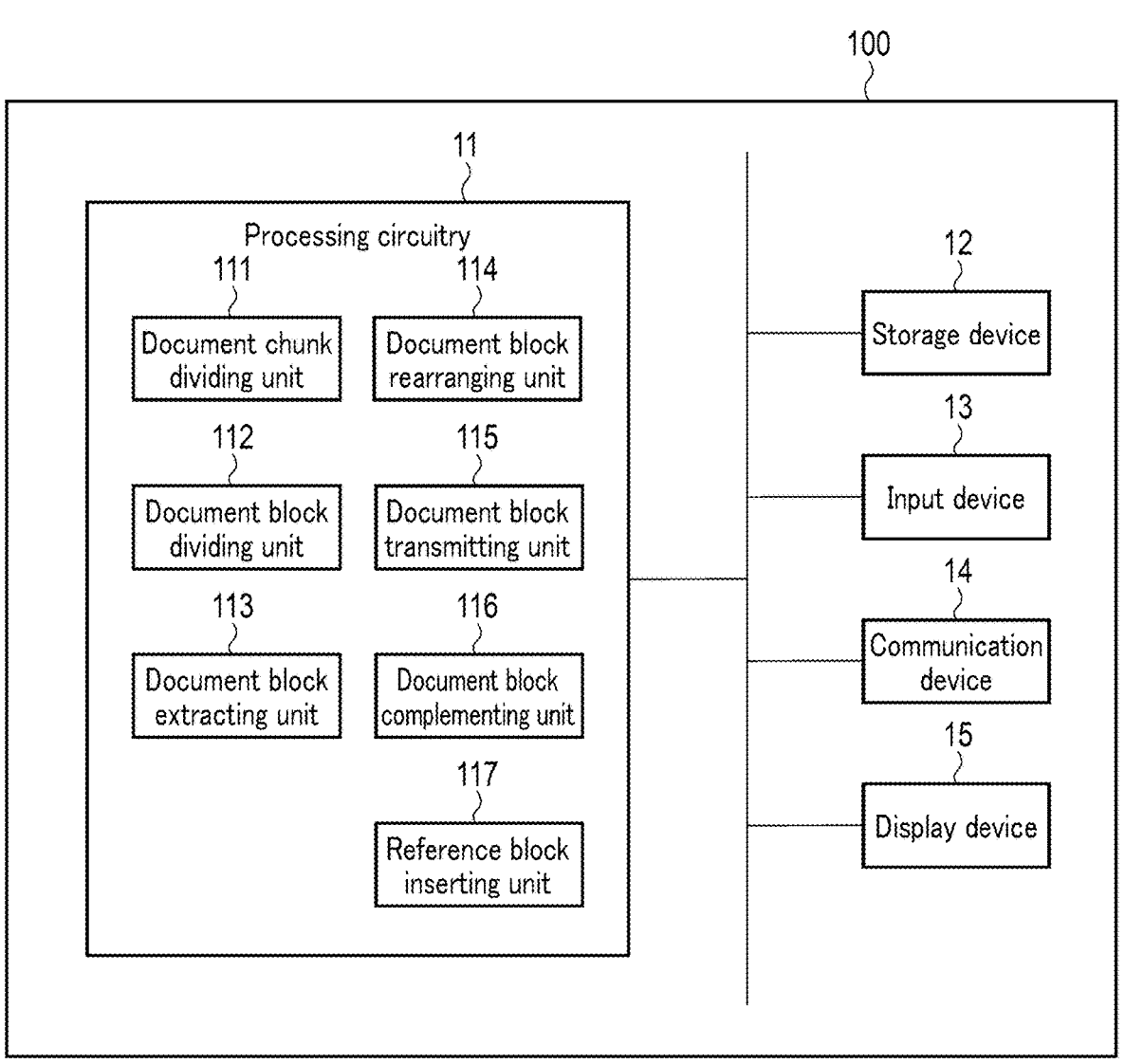
F I G. 17

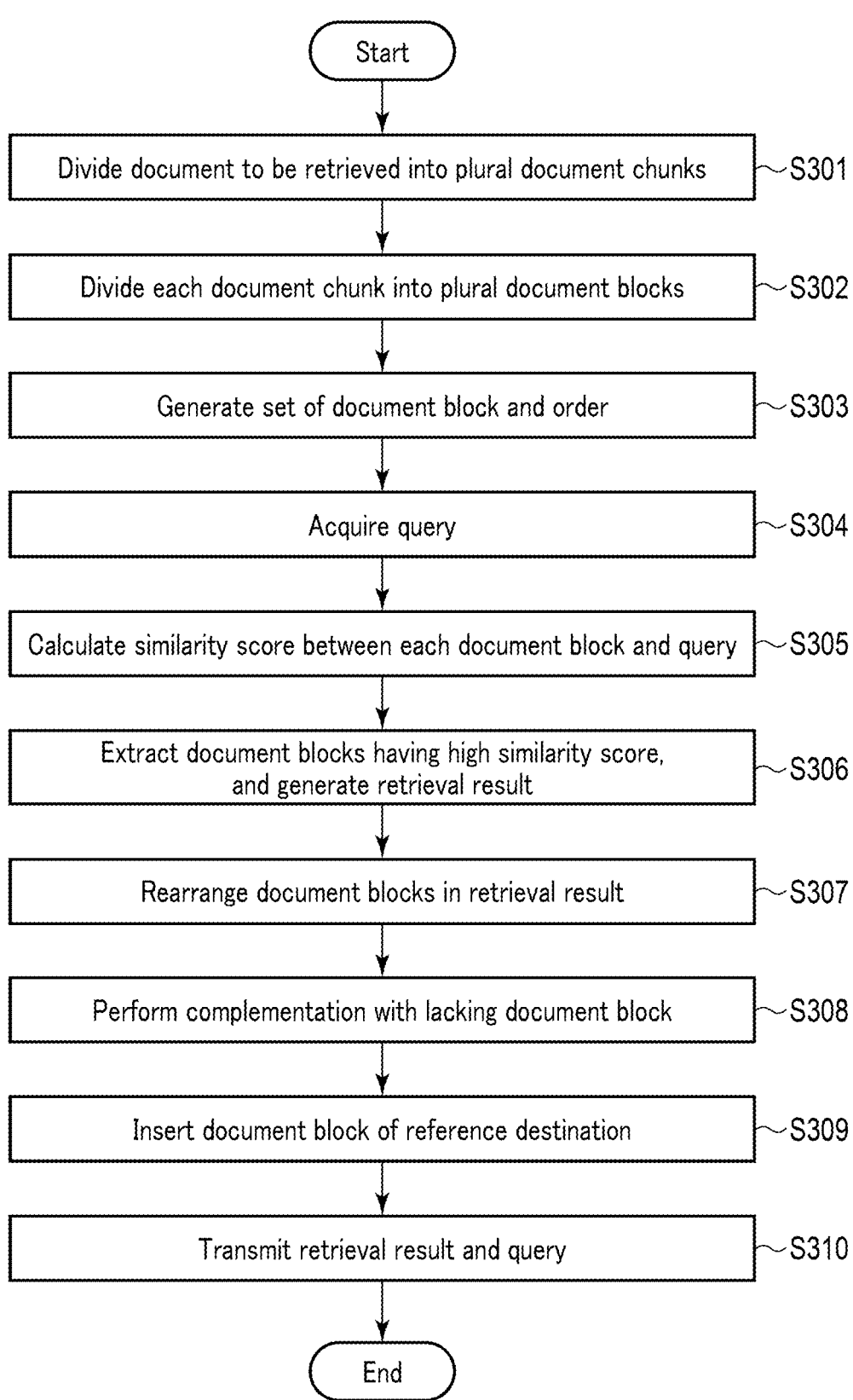

Start

Divide document to be retrieved into plural document chunks ~S301

Divide each document chunk into plural document blocks ~S302

Generate set of document block and order ~S303

Acquire query ~S304

Calculate similarity score between each document block and query ~S305

Extract document blocks having high similarity score, and generate retrieval result ~S306

Rearrange document blocks in retrieval result ~S307

Perform complementation with lacking document block ~S308

Insert document block of reference destination ~S309

Transmit retrieval result and query ~S310

End

F I G. 18

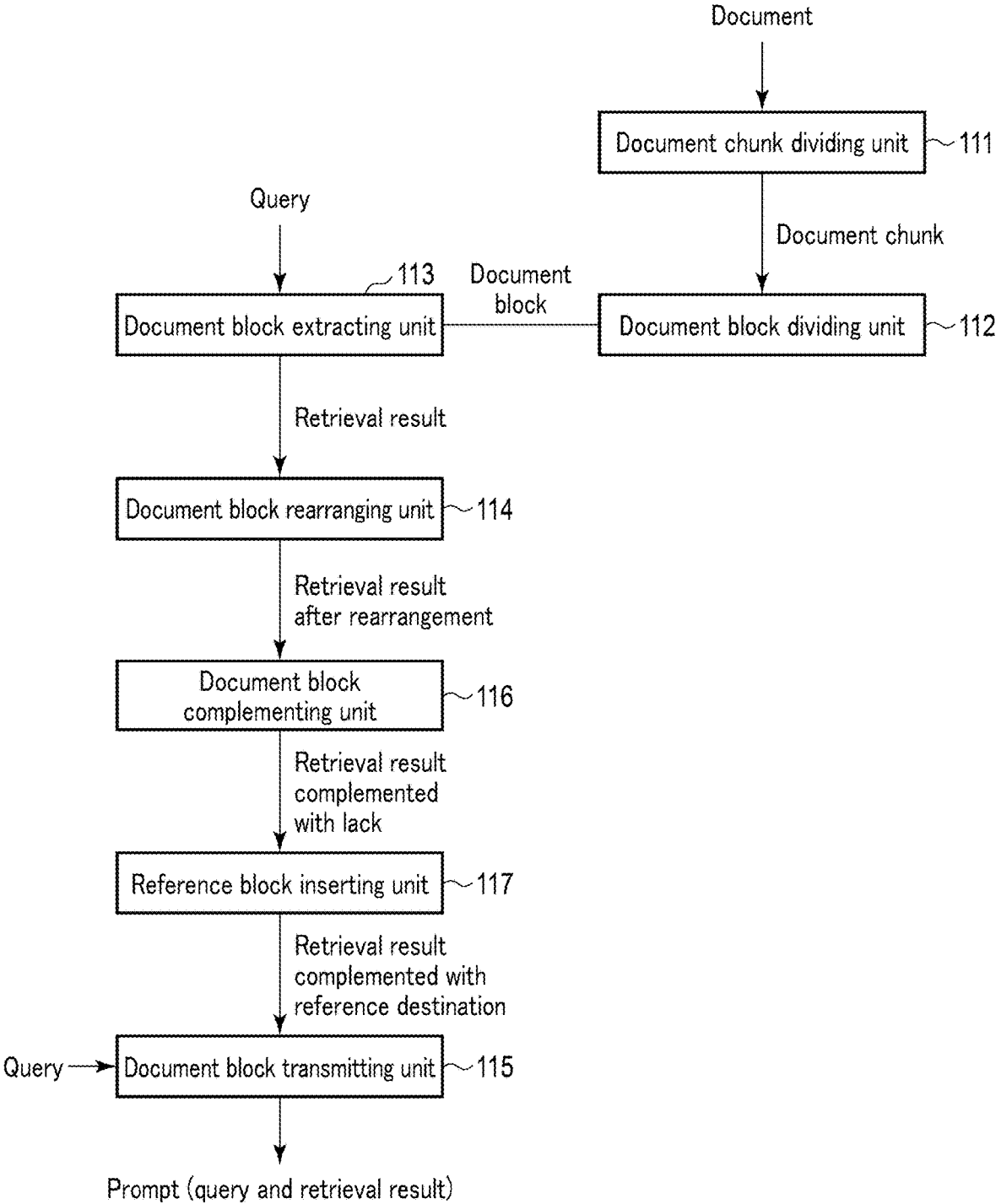
F I G. 19

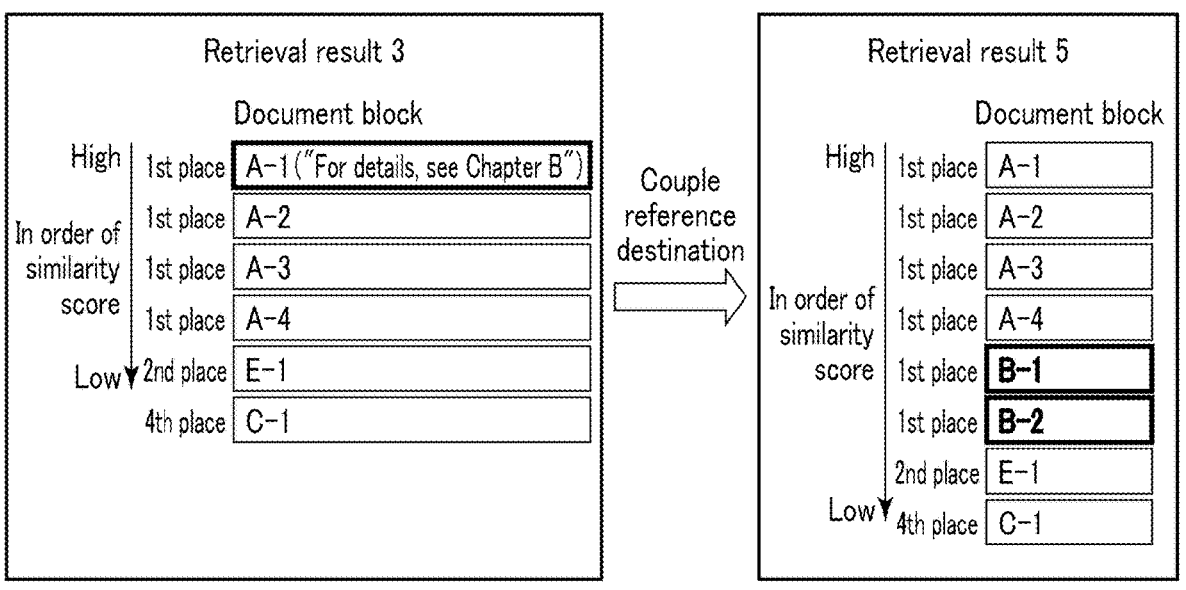
F I G. 20
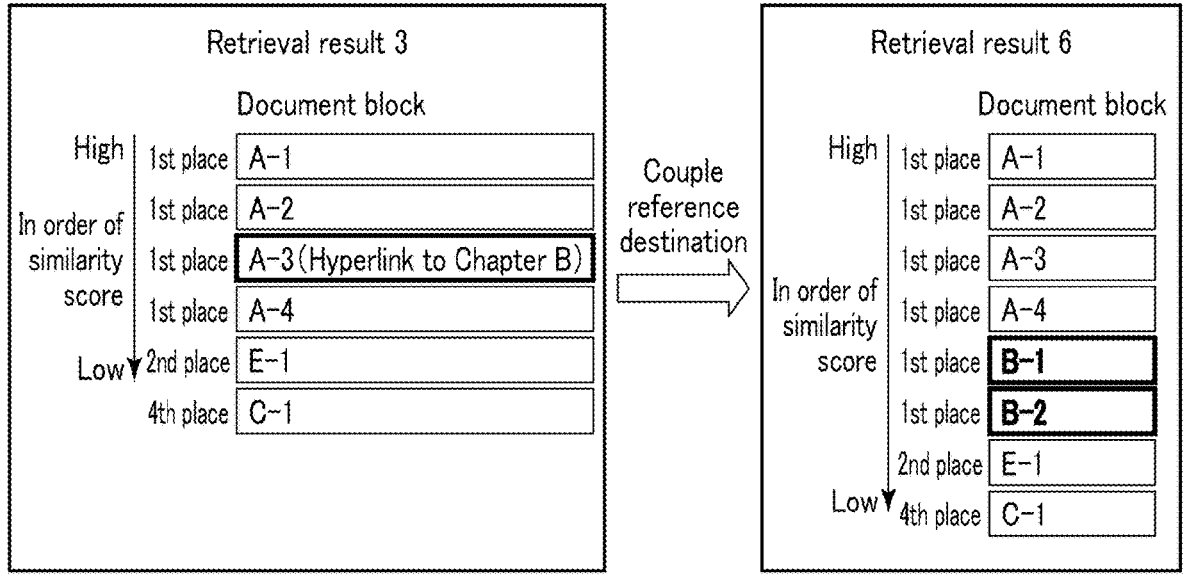
F I G. 21

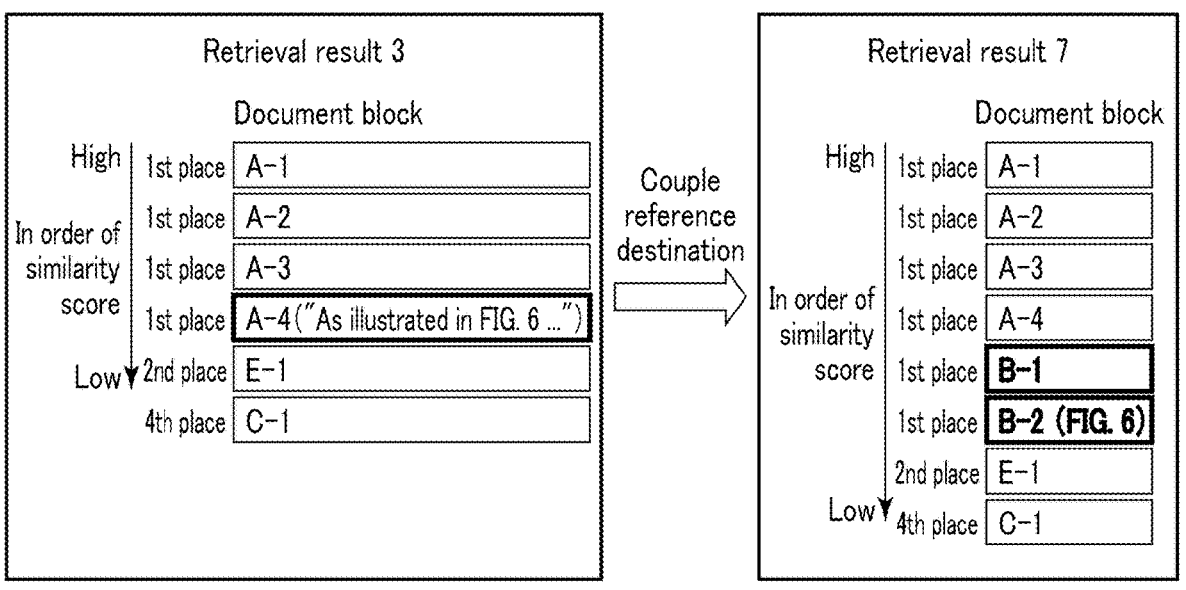
F I G. 22
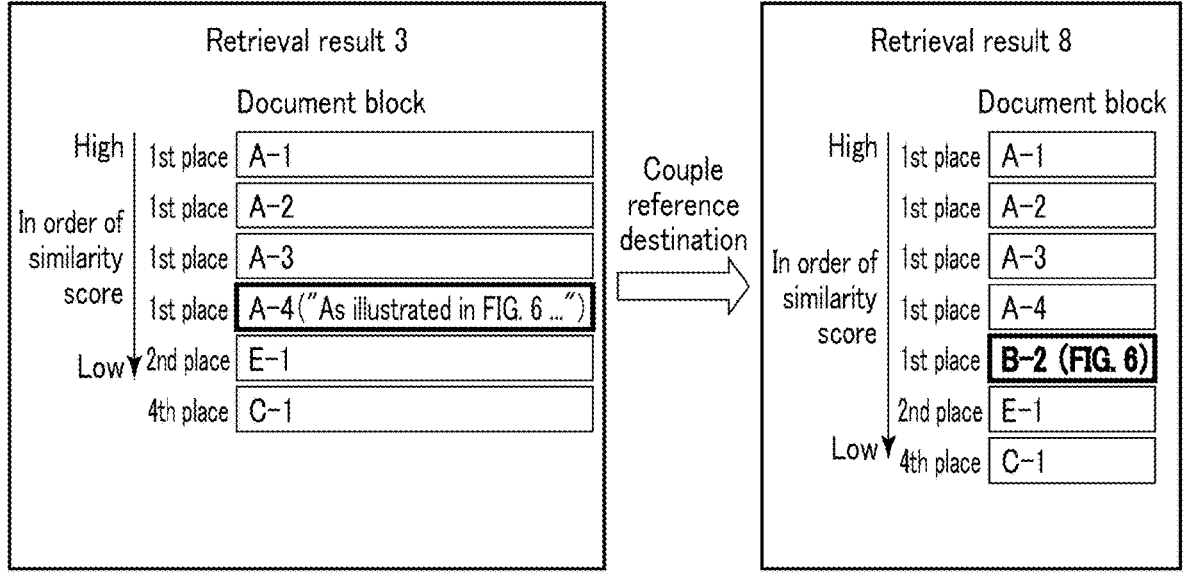
F I G. 23

STORAGE MEDIUM, DOCUMENT PROCESSING APPARATUS, AND DOCUMENT PROCESSING METHOD

CROSS-REFERENCE TO RELATED APPLICATION

This application is based upon and claims the benefit of priority from Japanese Patent Application No. 2024-090080, filed Jun. 3, 2024, the entire contents of which are incorporated herein by reference.

FIELD

Embodiments described herein relate generally to a storage medium, a document processing apparatus, and a document processing method.

BACKGROUND

In recent years, a large language model (LLM) has been able to be trained by using a large amount of text data, and the large language model has been able to make an answer to a query that was input in a natural language. In a system using such a large language model, by retrieving information that is relevant to a query from a document database that has been constructed in advance, and inputting the query and a retrieval result to the large language model, an appropriate answer is generated.

In general, there is a limit to the number of characters of a prompt that can be transmitted to the large language model. Therefore, in order to achieve a high-performance retrieval response by using a small number of characters, a document to be retrieved is divided into small text fragments (document blocks), and a prompt is generated by using a retrieval result of extracting a portion that is similar to a query from the small text fragments. However, if text fragments included in the prompt only include the partial content of the document, an incomplete answer to the query is generated in some cases.

BRIEF DESCRIPTION OF DRAWINGS

FIG. 1 is a diagram illustrating an example of a configuration of a question answering system according to a first embodiment.

FIG. 2 is a diagram illustrating an example of a configuration of a document processing apparatus according to the first embodiment.

FIG. 5 is a diagram illustrating an example of a flow of data in the prompt generating process performed by the document processing apparatus according to the first embodiment.

FIG. 6 is a diagram illustrating an example of a retrieval result according to the first embodiment.

FIG. 7 is a diagram illustrating an example of rearrangement of a retrieval result according to the first embodiment.

FIG. 8 is a diagram illustrating an example of an experimental result of answer accuracy according to the first embodiment.

FIG. 9 is a diagram illustrating a histogram of the experimental result of FIG. 8.

FIG. 10 is a diagram illustrating an example of a configuration of a document processing apparatus according to a second embodiment.

FIG. 11 is a flowchart illustrating a processing procedure of prompt generating process performed by the document processing apparatus according to the second embodiment.

FIG. 12 is a diagram illustrating an example of a flow of data in the prompt generating process performed by the document processing apparatus according to the second embodiment.

FIG. 13 is a diagram illustrating an example of complementation with a lacking document block according to the second embodiment.

FIG. 14 is a diagram illustrating an example of an experimental result of answer accuracy according to the second embodiment.

FIG. 15 is a diagram illustrating a histogram of the experimental result of FIG. 14.

FIG. 16 is a diagram illustrating an example of complementation with a document block according to a variation of the second embodiment.

FIG. 17 is a diagram illustrating an example of a configuration of a document processing apparatus according to a third embodiment.

FIG. 18 is a flowchart illustrating a processing procedure of prompt generating process performed by the document processing apparatus according to the third embodiment.

FIG. 19 is a diagram illustrating an example of a flow of data in the prompt generating process performed by the document processing apparatus according to the third embodiment.

FIG. 20 is a diagram illustrating an example of insertion of a document block of a reference destination according to the third embodiment.

FIG. 21 is a diagram illustrating an example of insertion of a document block of a reference destination according to a first variation of the third embodiment.

FIG. 22 is a diagram illustrating an example of insertion of a document block of a reference destination according to a second variation of the third embodiment.

FIG. 23 is a diagram illustrating an example of insertion of a document block of a reference destination according to a third variation of the third embodiment.

DETAILED DESCRIPTION

Figure 3:
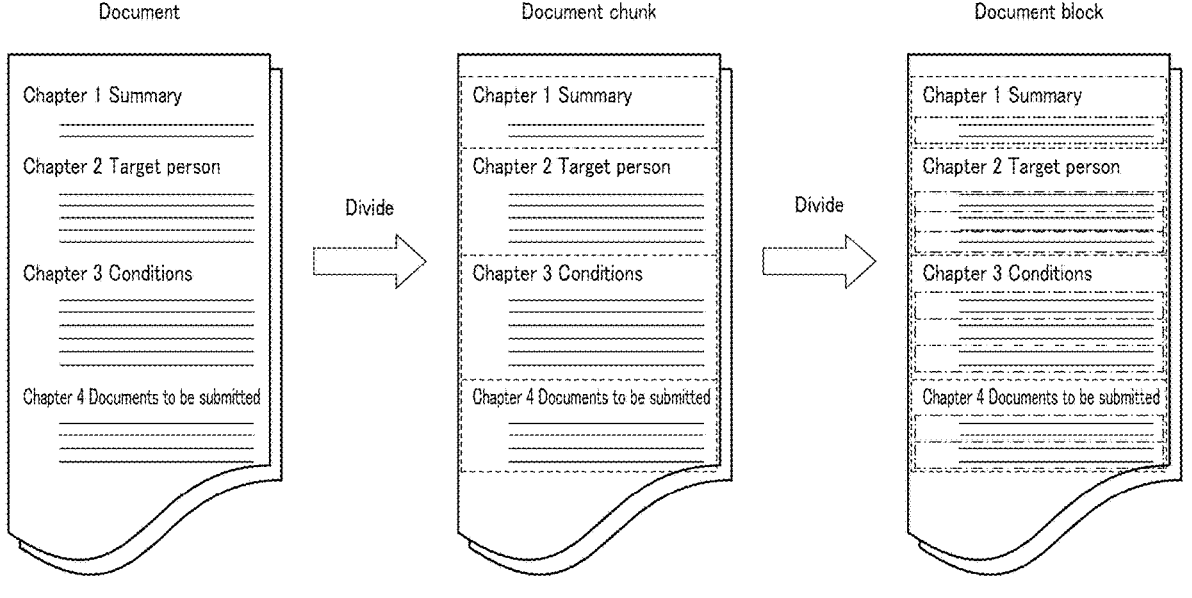
FIG. 3 is a diagram illustrating an example of a dividing method of a document according to the first embodiment.

In general, according to one embodiment, a non-transitory computer-readable storage medium storing a program for causing a computer to execute: a document chunk dividing function that divides a document to be retrieved into individual content chunks to generate document chunks; a document block dividing function that divides each of the document chunks into document blocks having a predetermined number or less of characters, and gives the document blocks an order in the document chunks that the document blocks belong to; a document block extracting function that calculates a similarity score to a query for each of the document blocks, extracts the document blocks for which the similarity score is high from among the document blocks, and generates a retrieval result in which the document blocks that were extracted were arranged in descending order of the similarity score; and a document block rearranging function that rearranges the order of the document blocks included in the retrieval result to make the order of the document blocks that belong to an identical document chunk consecutive, and make the order of the document blocks that belong to the identical document chunk match the order in the document chunk.

Hereinafter, embodiments of a document processing program, a document processing apparatus, and a document processing method will be described in detail with reference to the drawings. In the description below, components that have a roughly identical function and configuration are denoted by an identical reference sign, and a duplicate description will be provided only if necessary.

First Embodiment

FIG. 1 is a diagram illustrating a configuration of a question answering system 1 including a document processing apparatus 100 according to a first embodiment. The question answering system 1 is an interactive computer network system that retrieves, from a document to be retrieved, a sentence that is relevant to a query from a user, based on an input of the query, and generates an answer sentence to the query based on a retrieval result. As illustrated in FIG. 1, the question answering system 1 includes the document processing apparatus 100, a document database 200, a client terminal 300, and a response generating apparatus 400.

The document processing apparatus 100 is connected to the document database 200, the client terminal 300, and the response generating apparatus 400 via a network or the like. Furthermore, the client terminal 300 and the response generating apparatus 400 are connected via the network or the like. The network is, for example, a local area network (LAN). Note that connection to the network may be wired connection or wireless connection. Furthermore, the network is not limited to the LAN, and may be the Internet, a public communication line, or the like.

The document database 200 is a computer that holds a database in which plural pieces of document data to be retrieved were accumulated. As the document data, for example, document data of the HTML format or the PDF format can be used, but data of any other format may be used. In the description below, the "document data" is also simply referred to as a "document". Each document is formed by a plurality of sentences, words, symbols, or the like. A type of a document to be retrieved may be a question and answer (QA) document, a frequently asked question (FAQ) document, a report, a description, or any other type of document.

The client terminal 300 is a computer that is used by a user of the question answering system 1. The client terminal 300 includes, as hardware, a processor, an input device, a display device, and a communication device, and functions as a user interface of the question answering system 1. For example, the client terminal 300 receives an input of a query from the user, via the input device. The query is text data relating to the content to be retrieved. The query can also be referred to as a retrieval inquiry from the user. The query may be a natural sentence, or may only be formed by a word. The client terminal 300 transmits the query that was input by the user, via the network to the document processing apparatus 100.

The response generating apparatus 400 is a computer that stored a large language model. The response generating apparatus 400 includes, as hardware, a processor and a communication device. As the large language model, for example, ChatGPT can be used. The response generating apparatus 400 receives a prompt that was transmitted from the document processing apparatus 100, and inputs the received prompt to the large language model. The response generating apparatus 400 acquires an answer sentence that was output from the large language model, and transmits the acquired answer sentence to the client terminal 300. The answer sentence that was transmitted from the response generating apparatus 400 is displayed in the display device of the client terminal 300.

The document processing apparatus 100 functions as a server apparatus of the question answering system 1. Specifically, the document processing apparatus 100 receives a query from the client terminal 300, retrieves a sentence that is relevant to the query from a document stored in the document database 200 based on the received query, generates a prompt that includes the query and a retrieval result, and transmits the prompt to the response generating apparatus 400. There is a limit to the number of characters of a prompt that can be input to the large language model, and therefore the document processing apparatus 100 generates a prompt having a size that corresponds to the specifications of a large language model to be used.

FIG. 2 is a diagram illustrating a configuration example of the document processing apparatus 100. As illustrated in FIG. 2, the document processing apparatus 100 is a computer that includes processing circuitry 11, a storage device 12, an input device 13, a communication device 14, and a display device 15. Data communication among the processing circuitry 11, the storage device 12, the input device 13, the communication device 14, and the display device 15 is performed via a bus. The input device 13 and the display device 15 may be omitted.

The processing circuitry 11 includes a processor such as a central processing unit (CPU), and a memory such as a random access memory (RAM). The processing circuitry 11 includes a document chunk dividing unit 111, a document block dividing unit 112, a document block extracting unit 113, a document block rearranging unit 114, and a document block transmitting unit 115. The processing circuitry 11 achieves a document chunk dividing function, a document block dividing function, a document block extracting function, a document block rearranging function, and a document block transmitting function of the respective units described above, by executing a document processing program. The document processing program has been stored in a non-transitory computer-readable recording medium such as the storage device 12. The document processing program may be implemented as a single program describing all of the functions of the respective units described above, or may be implemented as a plurality of modules that was divided as some functional units. Furthermore, the respective units described above may be implemented by an integrated circuit such as an application specific integrated circuit (ASIC).

In this case, the respective units described above may be implemented in a single integrated circuit, or may be individually integrated in a plurality of integrated circuits.

The storage device 12 is formed by a read only memory (ROM), a hard disk drive (HDD), a solid state drive (SSD), an integrated circuit storage device, or the like. The storage device 12 stores the document processing program or the like.

The input device 13 inputs various commands from an operator. As the input device 13, a keyboard, a mouse, various switches, a touch pad, a touch panel display, or the like can be used. An output signal from the input device 13 is supplied to the processing circuitry 11.

The communication device 14 is an interface configured to perform data communication with an external device that is connected to the document processing apparatus 100 via the network. As an example, the communication device 14 performs data communication with the document database 200, the client terminal 300, and the response generating apparatus 400.

The display device 15 displays various types of information. As the display device 15, a cathode-ray tube (CRT) display, a liquid crystal display, an organic electro luminescence (EL) display, a light-emitting diode (LED) display, a plasma display, or another arbitrary display that is known in this technical field can be appropriately used. Furthermore, the display device 15 may be a projector.

Next, the functions executed by the respective units of the processing circuitry 11 will be described in detail.

The document chunk dividing unit 111 divides each document to be retrieved that was acquired from the document database 200 into a plurality of document chunks. The document chunk is a unit at a time when a document was divided into individual content chunks. FIG. 3 is a diagram illustrating an example of a dividing method of the document chunk. The document chunk is formed by, for example, one chapter or one section in a document. Note that the document chunk may be formed by a plurality of chapters or a plurality of sections, or may be formed by a combination of a chapter and a section.

The document block dividing unit 112 divides each of the document chunks into a plurality of document blocks. The document block is a unit at a time when the document chunk was divided to have a specified number of characters or less, and is formed, for example, in sentence units. FIG. 3 is a diagram illustrating an example of a dividing method of the document block. The number of characters included in the document block is set according to the specifications of a large language model that is used in the response generating apparatus 400. For example, a maximum size of a prompt that can be input to ChatGPT is several thousands to several tens of thousands of characters. In a case where a prompt that exceeds this number of characters was input to ChatGPT, suitable processing is not performed, and the answer accuracy of ChatGPT deteriorates. Therefore, the document block dividing unit 112 generates the document block in such a way that a prompt that is formed by text having a certain number or less of characters that can be processed by a large language model used in the response generating apparatus 400 is generated. For example, a size of the document block is set according to a size of a prompt that can be used for the large language model, and the number of document blocks that are to be included in a retrieval result of the prompt.

Furthermore, the document block dividing unit 112 gives each of the generated document blocks information indicating an original document chunk and information indicating the order of a corresponding document block in the original document chunk. At this time, the document block dividing unit 112 generates, for each of the document blocks, a set formed by three pieces of information, the generated document block, information identifying a document chunk that the document block belongs to, and the order in the document chunk that document block belongs to. For example, in the example of FIG. 3, for a second document block of the document chunk "Chapter 3", a set of text data included in the document block, the information "Chapter 3", and the information "second order" is generated. By doing this, information indicating which portion of an original document chunk each of the document blocks was located in is given to each of the document blocks.

The document block extracting unit 113 retrieves a document block that is relevant to a query that a user input. At this time, the document block extracting unit 113 first calculates a score of a similarity score to the query for each of the document blocks. The score of the similarity score is an index indicating a similarity score between plural pieces of text. As the score of the similarity score, for example, a publicly known score, such as TF-IDF between words or cosine similarity between feature vectors, can be used. Hereinafter, the score of the similarity score is simply referred to as a similarity score. Next, the document block extracting unit 113 extracts a document block having a high score of the similarity score as the document block that is relevant to the query. At this time, the document block extracting unit 113 extracts a predetermined number of document blocks in descending order of the score of the similarity score, and generates a retrieval result in which plural extracted document blocks were arranged in descending order of the score of the similarity score. The retrieval result is information including text data in which pieces of text of document blocks were arranged in descending order of the score of the similarity score, and the place of the similarity score of each of the document blocks that were used. Stated another way, the retrieval result includes text in which sentences were arranged in descending order of a degree of relevance to the query. The retrieval result may be referred to as an extraction result. By using text data in which pieces of text of document blocks were arranged in descending order of the similarity score for a prompt of the large language model, the large language model can be caused to use a sentence that is relevant to the query with priority.

The document block rearranging unit 114 rearranges the order of document blocks included in the retrieval result in such a way that document blocks that belong to an identical document chunk are arranged in a collected state, and the order of the document blocks that belong to the identical document chunk matches the order in an original document chunk. At this time, the document block rearranging unit 114 changes the order of document blocks in the retrieval result in such a way that from among the document blocks included in the retrieval result, document blocks that belong to an identical document chunk are adjacent to each other. Then, the order of the document blocks in the retrieval result is changed in such a way that the order of the document blocks that belong to the identical document chunk matches the order in the original document chunk. At this time, the document block rearranging unit 114 changes a document block having a low similarity score from among the document blocks that belong to the identical document chunk to rank the same place as the place of a document block having a high similarity score from among the document blocks that belong to the identical document chunk, and moves a position. A retrieval result after rearrangement is stored in the storage device 12. The storage device 12 that stores the retrieval result after rearrangement is an example of a storage unit, and may be referred to as a document chunk storage unit.

The document block transmitting unit 115 combines the retrieval result after rearrangement with the query to generate a prompt to be input to the large language model, and transmits the generated prompt to the response generating apparatus 400. The prompt is input as an instruction to the large language model in the response generating apparatus 400.

(Prompt Generating Process)

Figure 4:
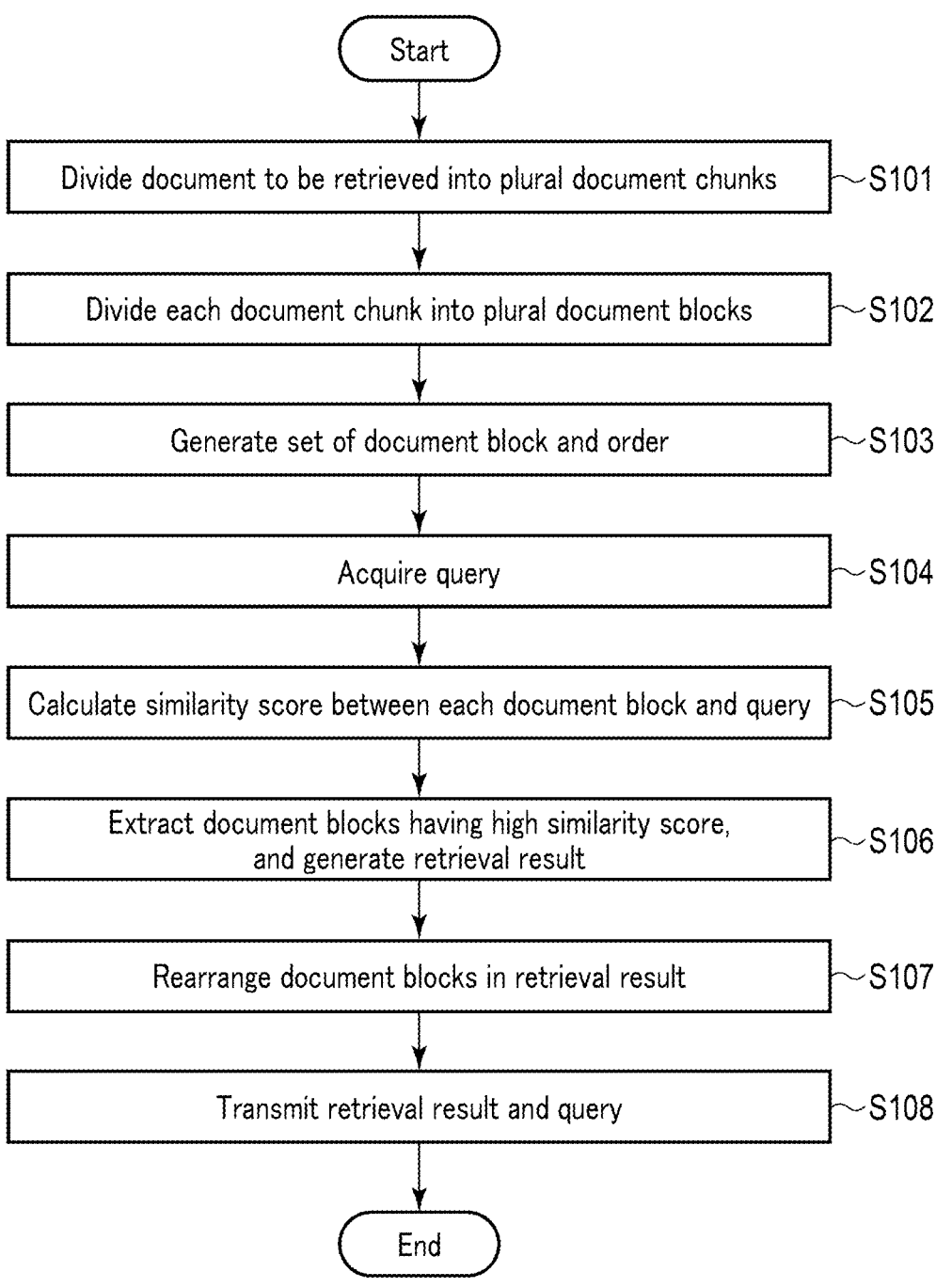
FIG. 4 is a flowchart illustrating a processing procedure of prompt generating process performed by the document processing apparatus according to the first embodiment.

Next, an operation of prompt generating process performed by the document processing apparatus 100 will be described. The document processing apparatus 100 starts prompt generating process based on a query having been input to the client terminal 300. FIG. 4 is a flowchart illustrating an example of a procedure of the prompt generating process. Furthermore, FIG. 5 is a diagram illustrating an example of a flow of data in the prompt generating process. Here, as an example, a case where a sentence that is relevant to a query is extracted from one document formed by "Chapter A", "Chapter B", "Chapter C", "Chapter D", and "Chapter E", and a prompt is generated by using the extracted sentence, will be described. Note that a processing procedure in each process described below is merely an example, and each of the processes can be changed as appropriately as possible. Furthermore, in the processing procedure described below, omissions, replacements, and additions can be appropriately made to steps depending on the embodiments.

(Step S101)

In the prompt generating process, first, the document chunk dividing unit 111 acquires a document to be retrieved from the document database 200, and divides the acquired document into a plurality of document chunks. Here, document chunk A formed by full text included in Chapter A, document chunk B formed by full text included in Chapter B, document chunk C formed by full text included in Chapter C, document chunk D formed by full text included in Chapter D, and document chunk E formed by full text included in Chapter E are generated.

(Step S102)

Next, the document block dividing unit 112 divides each of the document chunks into a plurality of document blocks. Note that in a case where the total number of characters included in a document chunk is smaller than or equal to the number of characters that can be input to the large language model, only one document block that includes full text included in the document chunk is generated.

(Step S103)

Next, the document block dividing unit 112 generates, for each of the document blocks, a set of a document block, a document chunk that the document chunk belonged to, and the order of the document block in the document chunk that the document block belonged to.

Here, it is assumed that five document blocks (document block A-1 to document block A-5) were generated from document chunk A, two document blocks (document block B-1 to document block B-2) were generated from document chunk B, one document block (document block C-1) was generated from document chunk C, four document blocks (document block D-1 to document block D-4) were generated from document chunk D, and three document blocks (document block E-1 to document block E-3) were generated from document chunk E. For example, for document block A-1, text included in document block A-1, "A" indicating a document chunk that document block A-1 belongs to, and "1" indicating the order of document block A-1 of document blocks A1 to A5 included in document chunk A are formed into a single set. Similarly, for all of the document blocks, a combination of a document chunk that a corresponding document block belongs to and the order in the document chunk is generated.

(Step S104)

Next, the document block extracting unit 113 acquires, from the client terminal 300, a query that a user input to the client terminal 300.

(Step S105)

Next, the document block extracting unit 113 calculates a similarity score to the query for each of the document blocks.

(Step S106)

Next, the document block extracting unit 113 extracts document blocks having a high similarity score, and generates a retrieval result in which the extracted document blocks were arranged in descending order of the similarity score. Here, description will be provided by using, as an example, a case where five document blocks having a high similarity score are extracted, and the five extracted document blocks are arranged in descending order of the similarity score. Retrieval result 1 of FIG. 6 indicates an example of the retrieval result. In FIG. 6, it is apparent that from among all of the document blocks, document block A-1 has a highest similarity score, document block E-1 has a second highest similarity score, document block A-4 has a third highest similarity score, document block C-1 has a fourth highest similarity score, and document block A-2 has a fifth highest similarity score.

(Step S107)

Next, the document block rearranging unit 114 rearranges the order of document blocks included in the retrieval result in such a way that document blocks that belong to an identical document chunk are arranged in a collected state. At this time, the document block rearranging unit 114 changes the order of arrangement of the document blocks included in the retrieval result in such a way that document blocks that belong to an identical document chunk are arranged in consecutive positions, and are arranged in the same order as the order in the document chunk that the document blocks belong to. In performing rearrangement, rearrangement determination is performed in descending order of degrees of similarity of document blocks included in retrieval result 1.

Here, description will be provided by using, as an example, the case of rearranging retrieval result 1. FIG. 7 is a diagram illustrating retrieval result 2 in which retrieval result 1 was rearranged. In performing rearrangement, first, for document block A-1 having a highest similarity score from among document blocks included in retrieval result 1, document block A-4 and document block A-2 that belong to an identical document chunk are extracted. Then, positions of document block A-4 and document block A-2 that were extracted are moved to positions that are continuous to a position of document block A-1. At this time, document blocks A-1, A-4, and A-2 that belong to identical document chunk A are rearranged in the same order as the order in document chunk A. This causes document blocks A-1, A-4, and A-2 to be rearranged to be consecutive in the order of document block A-1, document block A-2, and document block A-4. Furthermore, in retrieval result 2, from among document blocks A-1, A-4, and A-2 that belong to identical document chunk A, document blocks A-4 and A-2 having a low similarity score have been changed to have the same place (the first place) as the place of document block A-1 having a high similarity score, and have been moved to the position of document block A-1.

Next, for document block E-1 having a second highest similarity score, a document block that belongs to an identical document chunk is extracted. Here, in retrieval result 1, no other document blocks that belong to document chunk E are present, and therefore no document blocks that belong to the identical document chunk are extracted, and rearrangement is not performed. Document block A-4 having a third highest similarity score has already been rearranged, and therefore rearrangement is omitted. For document block C-1 having a fourth highest similarity score, no other document blocks that belong to document chunk C are present in retrieval result 1, and therefore no document blocks that belong to an identical document chunk are extracted, and rearrangement is not performed. Document block A-2 having a fifth highest similarity score has already been rearranged, and therefore rearrangement is omitted.

By performing the processing described above to rearrange retrieval result 1, retrieval result 2 in which document blocks were arranged in the order of document blocks A-1, A-2, A-4, E-1, and C-1 is generated. As a result of this, in retrieval result 2, document blocks are arranged to be collected according to document chunks that the document blocks belong to. Furthermore, in retrieval result 2, document blocks A-1, A-4, and A-2 that belong to identical document chunk A are arranged in the same order as the order in document chunk A.

(Step S108)

Next, the document block transmitting unit 115 combines the retrieval result after rearrangement with the query to generate a prompt, and transmits the generated prompt to the response generating apparatus 400.

The response generating apparatus 400 inputs the prompt received from the document processing apparatus 100 to the large language model to cause an answer sentence to be output, and transmits the acquired answer sentence to the client terminal 300. The client terminal 300 causes a display device to display the answer sentence that was received from the response generating apparatus 400.

Hereinafter, advantageous effects of the document processing apparatus 100 that executes the document processing program and the document processing method according to the present embodiment will be described.

The document processing apparatus 100 according to the present embodiment includes the document chunk dividing unit 111, the document block dividing unit 112, the document block extracting unit 113, the document block rearranging unit 114, and the document block transmitting unit 115. The document chunk dividing unit 111 divides a document to be retrieved into individual content chunks to generate document chunks. For example, the document chunk is formed, for example, in units of a chapter or a section of a document. The document block dividing unit 112 divides the document chunk into document blocks having a certain number of characters that is smaller than or equal to a predetermined number, and gives each of the document blocks the order in the document chunk that the document blocks belong to. The document block extracting unit 113 calculates, for each of the document blocks, a similarity score to a query, extracts document blocks having a high similarity score from the document blocks, and generates a retrieval result in which the extracted document blocks were arranged in descending order of the similarity score. The number of characters of the document block or the number of document blocks to be extracted is set to satisfy conditions of a size of a prompt that can be input to a large language model to be used. The document block rearranging unit 114 rearranges the order of the document blocks included in the retrieval result in such a way that the order of document blocks that belong to an identical document chunk is consecutive, and the order of the document blocks that belong to the identical document chunk matches the order in the document chunk.

Furthermore, the document processing apparatus 100 further includes the document block transmitting unit 115. The document block transmitting unit 115 generates a prompt by using the retrieval result after order rearrangement and the query, and transmits the generated prompt to the response generating apparatus 400. The prompt is input to the large language model in the response generating apparatus 400. The large language model retrieves, from text of the retrieval result, a description that is relevant to the query included in the prompt, and generates an answer sentence including an answer to the query. The answer sentence is transmitted from the response generating apparatus 400 to the client terminal 300, and is presented to a user.

In general, the large language model sequentially checks text of the retrieval result included in the prompt from the top, and analyzes the content of the retrieval result. Therefore, by using a prompt in which document blocks of a retrieval result were arranged in descending order of the similarity score, the large language model can be caused to use a sentence having a high similarity score to a query with priority. On the other hand, the text of the retrieval result is obtained by simply coupling pieces of text of a plurality of document blocks, and therefore in a case where document blocks that belong to different document chunks were coupled to each other, the content changes in a portion of coupling the document blocks, the large language model fails to appropriately analyze the content, and the accuracy of the large language model is likely to deteriorate. Therefore, if the retrieval result has many portions where document blocks that belong to different chunks were coupled, a prompt having many portions where the content changes is generated, and the answer accuracy of the large language model deteriorates. The document processing apparatus 100 according to the present embodiment can generate a retrieval result in which sentences describing identical content were arranged in a collected state, by consecutively arranging document blocks that belong to an identical document chunk.

For example, retrieval result 1 illustrated in FIGS. 6 and 7 indicates that document blocks have been arranged in descending order of the similarity score to a query, and therefore document blocks A-1, A-2, and A-4 that belong to identical document chunk A are arranged in first, third, and fifth positions of the retrieval result, and are not arranged in consecutive positions. Furthermore, as illustrated as first document block A-1 and second document block E-1, there are four portions where document blocks that are different in an original document chunk were coupled, and therefore a sentence includes four portions that are difficult to understand. On the other hand, in retrieval result 2 illustrated in FIG. 7, document blocks A-1, A-2, and A-4 that belong to identical document chunk A have been collected, and therefore the number of portions where document blocks that are different in the original document chunk are coupled is reduced to two. Therefore, a prompt using retrieval result 2 has answer accuracy of the large language model that is higher than answer accuracy of a prompt using retrieval result 1.

As described above, in retrieval result 1, document blocks E-1 and C-1 have been interposed between document block A-1 and document block A-4 or A-2 that belong to identical document chunk A, and therefore there is a high probability that document block A-4 will not be handled as a sentence having the same content as the content of document block A-1. Furthermore, the content changes when proceeding from a sentence of document block A-1 to a sentence of document block E-1, and therefore the large language model does not use sentences of document block E-1 and document blocks that follow to generate an answer in some cases. In this case, sentences of document blocks A-4 and A-2 are not used to generate an answer, although document blocks A-4 and A-2 belong to document chunk A having the same content as the content of document block A-1 having a highest similarity score to the query, and the answer accuracy deteriorates. On the other hand, in retrieval result 2, document blocks A-1, A-2, and A-4 that belong to identical document chunk A are consecutive. Therefore, document blocks A-1, A-2, and A-4 are appropriately handled as sentences having identical content, and the sentences of document blocks A-4 and A-2 that belong to document chunk A having the same content as the content of document block A-1 having a highest similarity score to the query are appropriately used to generate an answer.

Furthermore, in retrieval result 2, document blocks A-1, A-2, and A-4 are arranged in the same order as the order in original document chunk A. Therefore, the answer accuracy in the case of application to the large language model increases in comparison with a case where document blocks that belong to an identical document chunk were arranged in order of the similarity score.

FIG. 8 is a diagram illustrating an example of a change in accuracy of the large language model in a case where retrieval result 1 and retrieval result 2 were used for a prompt of the large language model. A vertical axis of FIG. 8 indicates a mean subjective evaluation score. The mean subjective evaluation score is a mean value of subjective evaluation scores. The subjective evaluation score is an experimental result of verifying the accuracy of an answer sentence that was output by the large language model. In this experiment, an evaluator performed five-stage subjective evaluation on an answer sentence to a query. The evaluator compared an answer sentence of the large language model with a correct answer prepared in advance, and determined a grade of the answer sentence by using the scoring reference table described below. In this experiment, the grade was set in such a way that an increase in accuracy of an answer sentence causes an increase in the grade. Then, a mean value of grades given by a plurality of evaluators was calculated as the mean subjective evaluation score. Note that in a case where an answer does not include correct answers, but only includes erroneous information, a minus grade was given. Furthermore, in the experiment, as the large language model, "ChatGPT-3.5-Turbo" from OpenAI was used.

| Grade 5 | Almost complete answer including 80% or more of correct answers |
| Grade 4 | Sufficient answer including most (51-79%) of correct answers |
| Grade 3 | Insufficient answer including 26-50% of correct answers |
| Grade 2 | Insufficient answer only including 25% or less of correct answers |
| Grade 1 | Insufficient answer only including one correct answer |
| Grade 0 | Answer indicating that no correct answers were found, or no answer |
| Grade −1 | Answer including no correct answers and only including erroneous information |

As illustrated in FIG. 8, a mean subjective evaluation score in a case where retrieval result 1 was used for a prompt was 3.7. On the other hand, a mean subjective evaluation score in a case where retrieval result 2 was used for a prompt was 3.83, and increased in comparison with the score of retrieval result 1. Furthermore, FIG. 9 is a diagram illustrating a histogram of each grade in the experimental result illustrated in FIG. 8. A vertical axis of FIG. 9 indicates the number of samples. In FIG. 9, it is apparent that in a case where retrieval result 2 was used for a prompt, the number of evaluations of the grade "5" increased, and the number of evaluations of the grade "3" decreased in comparison with a case where retrieval result 1 was used for a prompt. It was confirmed from FIGS. 8 and 9 that an accurate answer can be obtained from the large language model, by using retrieval result 2 in which document blocks were rearranged in consideration of document chunks that the document blocks belong to, in comparison with the case of using, for a prompt, retrieval result 1 in which document blocks were arranged in order of the similarity score.

In view of the above, by employing the document processing apparatus 100 according to the present embodiment, a retrieval result that the large language model can easily read, and the large language model can appropriately interpret can be generated, by rearranging document blocks included in a retrieval result in which document blocks that belong to an identical document chunk are separately located in such a way that the document blocks that belong to the identical document chunk are arranged in a collected state, and are arranged in the same order as the order in an original document chunk. By using a prompt using the retrieval result that was generated as described above, the answer accuracy of the large language model can be improved. In other words, a prompt in which pieces of information of an identical document chunk were collected in one portion is generated, and therefore a prompt in which text strings were arranged in the order that is easily understandable can be generated, the large language model can make an appropriate answer having less lack, and the answering performance of the large language model is improved. Stated another way, by restoring text fragments (document blocks) included in a retrieval result in the order in an original manual, the large language model can make a complete answer to a query.

Second Embodiment

A second embodiment will be described. The present embodiment is achieved by varying a configuration of the first embodiment as described below. Description of configurations, operations, and advantageous effects that are similar to those in the first embodiment will be omitted. In the present embodiment, a retrieval result is complemented with a lacking document block.

FIG. 10 is a diagram illustrating a configuration example of a document processing apparatus 100 according to the present embodiment. As illustrated in FIG. 10, in the present embodiment, processing circuitry 11 further includes a document block complementing unit 116. The processing circuitry 11 achieves a document block complementing function by executing a document processing program.

In a case where the order of a plurality of document blocks that belongs to an identical document chunk in the document chunk is not consecutive, the document block complementing unit 116 extracts a document block between these document blocks, and inserts the extracted document block between the document blocks that belong to the identical document chunk.

(Prompt Generating Process)

Next, an operation of prompt generating process performed by the document processing apparatus 100 according to the present embodiment will be described. FIG. 11 is a flowchart illustrating an example of a procedure of the prompt generating process. Furthermore, FIG. 12 is a diagram illustrating an example of a flow of data in the prompt generating process. The processes of step S201 to step S207 in FIG. 11 are similar to the processes of step S101 to step S107 in FIG. 4, and therefore description will be omitted.

(Step S208)

When rearrangement of document blocks included in a retrieval result was finished in the process of step S207, in a case where the order of document blocks that belong to an identical document chunk in the document chunk is not consecutive, the document block complementing unit 116 performs complementation with a lacking document block by inserting a document block located in a non-consecutive portion.

Here, description will be provided by using, as an example, a case where the processing described above is performed on retrieval result 2 in which retrieval result 1 was rearranged. FIG. 13 is a diagram illustrating retrieval result 3 in which retrieval result 2 was complemented with a document block. First, the document block complementing unit 116 determines that there is a lack between document block A-2 and document block A-4, and document block A-3 is missing because the order of document block A-2 and document block A-4 that belong to identical document chunk A is not consecutive. Then, the document block complementing unit 116 reads missing document block A-3 from a storage device 12, and inserts document block A-3 between document block A-2 and document block A-4 in the retrieval result.

(Step S209)

Next, a document block transmitting unit 115 combines the retrieval result after complementation with the lacking document block with a query to generate a prompt, and transmits the generated prompt to a response generating apparatus 400.

Note that the retrieval result after complementation with the lacking document block has increased in the number of characters in comparison with an initial retrieval result. In order to prevent the total number of characters in the retrieval result from exceeding a specified number of characters, a document block having a low similarity score in the retrieval result may be removed, after complementation with a document block. For example, it is sufficient if document block C-1 having a lowest similarity score in retrieval result 3 of FIG. 13 is removed, and the number of document blocks included in the retrieval result is reduced to an initial number or less (five or less).

Hereinafter, advantageous effects of the document processing apparatus 100 that executes the document processing program and the document processing method according to the present embodiment will be described.

In general, in a retrieval result generated by extracting document blocks in descending order of the similarity score, omission of an element between document blocks occurs in some cases. For example, as illustrated as retrieval result 2 in FIG. 13, a retrieval result in which an element (document block A-3) between document block A-2 and document block A-4 is missing is generated in some cases. In a case where a prompt that was generated by using such a retrieval result was input to the large language model, an answer sentence in which the content of the missing element was omitted is generated.

On the other hand, the document processing apparatus 100 according to the present embodiment further includes the document block complementing unit 116. In a case where from among document blocks included in a retrieval result, document blocks that belong to an identical document chunk does not have the consecutive order in the document chunk, the document block complementing unit 116 extracts a document block between these document blocks, and inserts the extracted document block between the document blocks. By employing the configuration described above, the document processing apparatus 100 according to the present embodiment can generate a retrieval result that was complemented with a missing document block, and therefore the large language model can be caused to output an appropriate answer sentence having less lack, and the answering performance of the large language model is improved.

FIG. 14 is a diagram illustrating an example of a change in accuracy of the large language model in a case where each of retrieval result 1, retrieval result 2, and retrieval result 3 was used for a prompt of the large language model. A vertical axis of FIG. 14 indicates a mean subjective evaluation score. Furthermore, FIG. 15 is a diagram illustrating a histogram of each grade in the experimental result illustrated in FIG. 14. A vertical axis of FIG. 15 indicates the number of samples. FIGS. 14 and 15 illustrate experimental results in a case where an experiment was conducted under experimental conditions that are similar to the experimental conditions of FIGS. 8 and 9.

As illustrated in FIG. 14, a mean subjective evaluation score in a case where retrieval result 3 was used for a prompt was 4.48, and increased in comparison with scores of retrieval result 1 and retrieval result 2. As a result of this, it was confirmed that an accurate answer can be obtained from the large language model, by using retrieval result 3 that was complemented with an element between non-consecutive document blocks, in comparison with the case of using, for a prompt, retrieval result 2 in which document blocks were rearranged in consideration with document chunks.

Furthermore, in FIG. 15, it is apparent that in a case where retrieval result 3 was used for a prompt, the number of evaluations of the grade "5" increased, and the number of evaluations of the grade "4" or a lower grade decreased in comparison with a case where retrieval result 2 was used for a prompt. From a decrease in an answer of the grade "4" or a lower grade indicating that an answer is incomplete and an increase in an answer of the grade "5" indicating a complete answer, it is apparent that the large language model became able to accurately process a retrieval result by complementing the retrieval result with an omitted document block.

In view of the above, the document processing apparatus 100 according to the present embodiment enables the large language model to easily process a prompt, and enables the large language model to make an accurate answer, by rearranging document blocks included in a retrieval result in the same order as the order of arrangement in a document chunk that the document blocks belong to, and performing complementation by using an element to be interposed in a case where element numbers in the document chunk are non-consecutive. Stated another way, in a case where numbers of document blocks included in a retrieval result are not consecutive, complementation is performed by using text to be interposed to form complete manual text, and this enables the large language model to make a complete answer.

Variation of Second Embodiment

In the embodiment described above, in a case where element numbers of document blocks included in a retrieval result are not consecutive, complementation was performed by using a document block to be interposed. In the present variation, complementation is performed by using all of the document blocks that belong to the same document chunk as a document chunk of a document block included in a retrieval result.

A document block complementing unit 116 according to the present variation acquires a document block that belongs to an identical document chunk for each of the document blocks included in a retrieval result, and inserts the acquired document block into the retrieval result.

For example, description will be provided by using, as an example, a case where the processing described above is performed on retrieval result 2. FIG. 16 is a diagram illustrating retrieval result 4 in which retrieval result 2 was complemented with document blocks. The document block complementing unit 116 reads, from a storage device 12, document blocks A-3 and A-5 included in document chunk A that is the same as a document chunk of document blocks A-1, A-2, and A-4, and inserts document blocks A-3 and A-5 into the retrieval result. At this time, document block A-3 is inserted between document block A-2 and document block A-4, and document block A-5 is inserted after document block A-4 in such a way that the order matches the order in original document chunk A. Similarly, the document block complementing unit 116 reads, from the storage device 12, document blocks E-2 and E-3 included in document chunk E that is the same as a document chunk of document block E-1, and inserts read document blocks E-2 and E-3 after document block E-1 in the retrieval result. Note that in the example of FIG. 16, document chunk C is only formed by document block C-1, and therefore the document block that belongs to the same document chunk C as the document block C-1 is not inserted into the retrieval result.

By employing the configuration described above, the document processing apparatus 100 according to the present variation enables the large language model to more easily process a prompt, and enables the large language model to make a more accurate answer, by performing complementation by using all pieces of information included in the same document chunk as a document chunk of a document block having a high similarity score, and therefore the answering performance of the large language model is further improved.

Third Embodiment

A third embodiment will be described. The present embodiment is achieved by varying a configuration of the second embodiment as described below. Description of configurations, operations, and advantageous effects that are similar to those in the second embodiment will be omitted. In the present embodiment, in a case where a retrieval result includes information indicating a reference destination, a document block of the reference destination is inserted into the retrieval result.

FIG. 17 is a diagram illustrating a configuration example of a document processing apparatus 100 according to the present embodiment. As illustrated in FIG. 17, in the present embodiment, processing circuitry 11 further includes a reference block inserting unit 117. The processing circuitry 11 achieves a reference block inserting function by executing a document processing program.

In a case where a retrieval result includes reference information indicating a reference destination, the reference block inserting unit 117 inserts a document block of the reference destination into the retrieval result. The reference information is, for example, text indicating the reference destination. Examples of the text indicating the reference destination include the text "see Chapter o"and the text" . . . will be described in Chapter o". The reference block inserting unit 117 detects the reference information indicating the reference destination from text included in the retrieval result, and inserts a document block of the reference destination after a document block including the reference information in the retrieval result.

(Prompt Generating Process)

Next, an operation of prompt generating process performed by the document processing apparatus 100 according to the present embodiment will be described. FIG. 18 is a flowchart illustrating an example of a procedure of the prompt generating process. Furthermore, FIG. 19 is a diagram illustrating an example of a flow of data in the prompt generating process. The processes of step S301 to step S308 in FIG. 18 are similar to the processes of step S201 to step S208 in FIG. 12, and therefore description will be omitted.

(Step S309)

In the process of step S308, when complementation with a lacking document block has finished, the reference block inserting unit 117 detects reference information indicating a referent destination from text data included in a reference result. The reference block inserting unit 117 reads, from the storage device 12, a document block that corresponds to the reference destination indicated by the detected reference information, and inserts the read document block into the retrieval result.

Here, description will be provided by using, as an example, a case where the processing described above is performed on retrieval result 3 illustrated in FIG. 13. FIG. 20 is a diagram illustrating an example of retrieval result 5 that was generated by inserting a document block of a reference destination into retrieval result 3. In FIG. 20, it is assumed that document block A-1 includes the text "for details, see Chapter B" indicating the reference destination. The reference block inserting unit 117 detects the text "for details, see Chapter B" as reference information indicating the reference destination, and detects "Chapter B" as the reference destination. The reference block inserting unit 117 reads, from the storage device 12, all document blocks B-1 and B-2 included in document chunk B as document blocks that correspond to "Chapter B", and inserts document blocks B-1 and B-2 into the retrieval result. At this time, the reference block inserting unit 117 couples document blocks B-1 and B-2 after document block A-1 to document block A-4 of document chunk A that document block A-1 from which the reference information was detected belongs to.

(Step S310)

Next, a document block transmitting unit 115 combines the retrieval result into which the document block of the reference destination was inserted with a query to generate a prompt, and transmits the generated prompt to a response generating apparatus 400.

Note that the retrieval result into which the document block of the reference destination was inserted has increased in the number of characters in comparison with an initial retrieval result. In order to prevent the total number of characters in the retrieval result from exceeding a specified number of characters, a document block having a low similarity score in the retrieval result may be removed.

Hereinafter, advantageous effects of the document processing apparatus 100 that executes the document processing program and the document processing method according to the present embodiment will be described.

In some cases, the description of even a document block having a high degree of relevance to a query fails to be accurately understood if a description or a diagram or table in another chapter is not referred to. The document processing apparatus 100 according to the present embodiment further includes the reference block inserting unit 117. In a case where a retrieval result includes reference information indicating a reference destination, the reference block inserting unit 117 inserts a document block of the reference destination into the retrieval result. By employing the configuration described above, the document processing apparatus 100 according to the present embodiment can generate a retrieval result that was complemented with information of another document chunk that is relevant to the content included in the retrieval result, and therefore the large language model can be caused to output an appropriate answer sentence having less lack, and the answering performance of the large language model is improved.

First Variation of Third Embodiment

Instead of text indicating a document chunk of a reference destination, a hyperlink for displaying the reference destination may be used as the reference information. A hyperlink that causes a display of a relevant portion that has been set in advance if selected is embedded into some documents of the HTML format, some documents of the PDF format, or the like. The content of a reference destination that was embedded into the hyperlink is relevant to the content of a portion describing the hyperlink in many cases. Therefore, by inserting, into a retrieval result, a document block that corresponds to the reference destination of the hyperlink that was detected from a document block of the retrieval result, complementation can be performed by using the content that is relevant to the retrieval result.

Here, description will be provided by using, as an example, a case where the processing described above is performed on retrieval result 3 illustrated in FIG. 13. FIG. 21 is a diagram illustrating an example of retrieval result 6 that was generated by inserting a document block of a reference destination into retrieval result 3. In FIG. 21, it is assumed that a hyperlink for moving to Chapter B if selected has been embedded into document block A-3. The reference block inserting unit 117 detects the hyperlink as reference information indicating the reference destination, and detects "Chapter B" as the reference destination. The reference block inserting unit 117 reads, from the storage device 12, all document blocks B-1 and B-2 included in document chunk B as document blocks that correspond to "Chapter B", and inserts document blocks B-1 and B-2 into the retrieval result. At this time, the reference block inserting unit 117 inserts document blocks B-1 and B-2 after document block A-1 to document block A-4 of document chunk A that document block A-3 from which the reference information was detected belongs to.

Second Variation of Third Embodiment

Furthermore, instead of text indicating a document chunk of a reference destination, text indicating a diagram or table of the reference destination may be used as the reference information. Examples of the text indicating a diagram or table include the number or title of the diagram, the number or title of the table, and the like. In some general documents, a description indicating a diagram or table of the reference destination, such as "as illustrated in table o" or "the result . . . was obtained (FIG. o).", is used. A chapter describing the diagram or table described above is relevant to the content of a portion describing the text indicating the diagram or table of the reference destination in many cases. Therefore, by inserting, into a retrieval result, a document block that includes the detected diagram or table, complementation can be performed by using the content that is relevant to the retrieval result.

Here, description will be provided by using, as an example, a case where the processing described above is performed on retrieval result 3 illustrated in FIG. 13. FIG. 22 is a diagram illustrating an example of retrieval result 7 that was generated by inserting a document block of a reference destination into retrieval result 3. In FIG. 22, the text "as illustrated in FIG. 6 . . . " indicating a diagram of the reference destination is included in document block A-4, and "FIG. 6" is displayed in document block B-2. The reference block inserting unit 117 detects the text "as illustrated in FIG. 6 . . . " as reference information indicating the reference destination, and detects document block B-2 describing "FIG. 6" as the reference destination. The reference block inserting unit 117 reads, from the storage device 12, all document blocks B-1 and B-2 included in document chunk B that document block B-2 belongs to, as document blocks that correspond to document block B-2, and inserts document blocks B-1 and B-2 into the retrieval result. At this time, the reference block inserting unit 117 inserts document blocks B-1 and B-2 after document block A-1 to document block A-4 of document chunk A that document block A-4 from which the reference information was detected belongs to.

Third Variation of Third Embodiment

Note that in a case where a document block can be specified as the reference destination, only the specified document block may be inserted. FIG. 23 is a diagram illustrating an example of retrieval result 8 that was generated by inserting a document block of a reference destination into retrieval result 3 illustrated in FIG. 13. For example, in a case where document block B-2 describing "FIG. 6" was detected as the reference destination, the reference block inserting unit 117 reads, from the storage device 12, only document block B-2 as a document block that corresponds to document block B-2, and inserts document block B-2 into the retrieval result. At this time, the reference block inserting unit 117 inserts document block B-2 after document block A-1 to document block A-4 of document chunk A that document block A-4 from which the reference information was detected belongs to. In this case, in comparison with a case where all document blocks B-1 and B-2 included in document chunk B that document block B-2 belongs to are inserted as document blocks that correspond to document block B-2, as illustrated in FIG. 22, a retrieval result that was complemented with information of another document chunk that is relevant to the content included in the retrieval result can be generated, and a total amount of text included in the retrieval result can be reduced.

Thus, according to any of the embodiments described above, a document processing program, a document processing apparatus, and a document processing method that generate a retrieval result to be used for a prompt of the large language model, and a retrieval result for obtaining a highly accurate answer can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory computer-readable storage medium storing a program for causing a computer to execute:

a document chunk dividing function that divides a document to be retrieved into individual content chunks to generate document chunks;

a document block dividing function that divides each of the document chunks into document blocks having a predetermined number or less of characters, and gives the document blocks an order in the document chunks that the document blocks belong to;

a document block extracting function that calculates a similarity score to a query for each of the document blocks, extracts the document blocks for which the similarity score is high from among the document blocks, and generates a retrieval result in which the document blocks that were extracted are arranged in descending order of the similarity score;

a document block rearranging function that rearranges the order of the document blocks included in the retrieval result to make the order of the document blocks that belong to an identical document chunk consecutive, and to make the order of the document blocks that belong to the identical document chunk match the order in the document chunk; and a document block complementing function that performs complementation on the retrieval result by using a document block that is lacking, wherein, in a case where the order of the document blocks that belong to the identical document chunk in the document chunk is not consecutive, the document block complementing function extracts a document block between the document blocks that belong to the identical document chunk, and inserts the document block that was extracted between the document blocks that belong to the identical document chunk in the retrieval result.

2. The non-transitory computer-readable storage medium according to claim 1, the program further causing the computer to execute a transmitting function that generates a prompt by using the retrieval result in which the orders were rearranged and the query, and transmits the prompt that was generated to a large language model.

3. The non-transitory computer-readable storage medium according to claim 1, wherein the document block complementing function acquires the document block that belongs to the identical document chunk for each of the document blocks included in the retrieval result, and inserts the document block that was acquired into the retrieval result.

4. The non-transitory computer-readable storage medium according to claim 1, the program further causing the computer to execute a reference block inserting function that inserts the document block that corresponds to a reference destination after the document block including reference information, in a case where the retrieval result includes the reference information indicating the reference destination.

5. The non-transitory computer-readable storage medium according to claim 4, wherein:

the reference information is text indicating the document chunk of the reference destination, and the reference block inserting function inserts, into the retrieval result, the document block included in the document chunk that corresponds to the text.

6. The non-transitory computer-readable storage medium according to claim 4, wherein;

the reference information is a hyperlink that causes the reference destination to be displayed, and the reference block inserting function inserts, into the retrieval result, the document block included in the document chunk that corresponds to the hyperlink.

7. The non-transitory computer-readable storage medium according to claim 4, wherein:

the reference information is text indicating a diagram or table of the reference destination, and the reference block inserting function inserts, into the retrieval result, the document block included in the document chunk that includes the diagram or table.

8. The non-transitory computer-readable storage medium according to claim 1, wherein the document block rearranging function changes a place of the document block for which the similarity score is low from among the document blocks that belong to the identical document chunk to the place that is identical to the place of the document block for which the similarity score is high from among the document blocks that belong to the identical document chunk.

9. A document processing apparatus comprising:

processing circuitry configured to execute processes comprising:

dividing a document to be retrieved into individual content chunks to generate document chunks;

dividing each of the document chunks into document blocks having a predetermined number or less of characters, and giving the document blocks an order in the document chunks that the document blocks belong to;

calculating a similarity score to a query for each of the document blocks, extracting the document blocks for which the similarity score is high from among the document blocks, and generating a retrieval result in which the document blocks that were extracted are arranged in descending order of the similarity score;

rearranging the order of the document blocks included in the retrieval result to make the order of the document blocks that belong to an identical document chunk consecutive, and to make the order of the document blocks that belong to the identical document chunk match the order in the document chunk; and performing complementation on the retrieval result by using a document block that is lacking; and a storage medium that stores the retrieval result in which the order was rearranged, wherein, in a case where the order of the document blocks that belong to the identical document chunk in the document chunk is not consecutive, the performing the complementation comprises extracting a document block between the document blocks that belong to the identical document chunk, and inserting the document block that was extracted between the document blocks that belong to the identical document chunk in the retrieval result.

10. A document processing method comprising:

dividing a document to be retrieved into individual content chunks to generate document chunks;

dividing each of the document chunks into document blocks having a predetermined number or less of characters, and giving the document blocks an order in the document chunks that the document blocks belong to;

calculating a similarity score to a query for each of the document blocks, extracting the document blocks for which the similarity score is high from among the document blocks, and generating a retrieval result in which the document blocks that were extracted are arranged in descending order of the similarity score;

rearranging the order of the document blocks included in the retrieval result to make the order of the document blocks that belong to an identical document chunk consecutive, and to make the order of the document blocks that belong to the identical document chunk match the order in the document chunk; and performing complementation on the retrieval result by using a document block that is lacking, wherein, in a case where the order of the document blocks that belong to the identical document chunk in the document chunk is not consecutive, the performing the complementation comprises extracting a document block between the document blocks that belong to the identical document chunk, and inserting the document block that was extracted between the document blocks that belong to the identical document chunk in the retrieval result.

\* \* \* \* \*